US009781393B2

(12) United States Patent
Kudo et al.

(10) Patent No.: US 9,781,393 B2
(45) Date of Patent: Oct. 3, 2017

(54) IMAGING APPARATUS, CONTROL METHOD OF IMAGING APPARATUS, AND NON-TRANSITORY STORAGE MEDIUM STORING CONTROL PROGRAM OF IMAGING APPARATUS

(71) Applicant: OLYMPUS CORPORATION, Hachioji-shi, Tokyo (JP)

(72) Inventors: Hiroki Kudo, Hachioji (JP); Tetsuya Toyoda, Hachioji (JP); Yuiko Uemura, Hachioji (JP); Yuki Mishio, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/075,838

(22) Filed: Mar. 21, 2016

(65) Prior Publication Data

US 2016/0286189 A1    Sep. 29, 2016

(30) Foreign Application Priority Data

Mar. 27, 2015   (JP) ................... 2015-067719
Jun. 17, 2015   (JP) ................... 2015-122209

(51) Int. Cl.
*H04N 9/04*     (2006.01)
*H04N 9/74*     (2006.01)
(Continued)

(52) U.S. Cl.
CPC ......... *H04N 9/045* (2013.01); *G06F 3/04847* (2013.01); *H04N 5/2355* (2013.01); *H04N 5/2356* (2013.01); *H04N 5/23293* (2013.01); *H04N 5/243* (2013.01); *H04N 5/2621* (2013.01); *H04N 9/74* (2013.01); *H04N 5/23229* (2013.01); *H04N 9/643* (2013.01)

(58) Field of Classification Search
CPC .............. G06F 3/0481; G06F 3/04845; G06F 3/04847; G06F 3/0488; G06F 3/04817; G06F 3/0482; H04N 5/23293; H04N 5/23216; H04N 5/23229; H04N 9/735; H04N 9/045; H04N 9/643; H04N 9/646; H04N 9/75
See application file for complete search history.

(56) References Cited

U.S. PATENT DOCUMENTS 4,381,885 A     5/1983  Coquin
8,031,974 B2 *  10/2011 Ogawa ................ G06F 3/04845
                                                382/298
(Continued)

FOREIGN PATENT DOCUMENTS

JP          54-130121 A     10/1979

*Primary Examiner* — Michael Osinski
(74) *Attorney, Agent, or Firm* — Volpe and Koenig, P.C.

(57) ABSTRACT

An imaging apparatus include an imaging processing unit, a dial operation unit, a boundary setting unit, and a control unit. The imaging processing unit acquires image data having a predetermined image effect. The dial operation unit receives a dial operation to set at least one boundary line in the image data. The boundary setting unit sets the boundary line in the image data in response to the dial operation. The control unit controls the imaging processing unit so that image data having different image effects are obtained in the respective partial regions of the image data that are divided by the boundary line set by the boundary setting unit.

11 Claims, 22 Drawing Sheets

(51) Int. Cl.
  *H04N 5/235* (2006.01)
  *H04N 5/243* (2006.01)
  *H04N 5/262* (2006.01)
  *H04N 9/64* (2006.01)
  *G06F 3/0484* (2013.01)
  *H04N 5/232* (2006.01)

(56) References Cited

U.S. PATENT DOCUMENTS

| | | | |
|---|---|---|---|
| 8,520,019 B1* | 8/2013 | Freyhult | G06F 3/0481 |
| | | | 345/581 |
| 9,407,816 B1* | 8/2016 | Sehn | H04N 5/23222 |
| 9,571,736 B2* | 2/2017 | Lee | H04N 5/23293 |
| 2010/0201705 A1* | 8/2010 | Takahashi | H04N 1/62 |
| | | | 345/600 |
| 2011/0032373 A1* | 2/2011 | Forutanpour | G11B 27/034 |
| | | | 348/222.1 |
| 2012/0002072 A1* | 1/2012 | Ogawa | G06F 3/04845 |
| | | | 348/222.1 |
| 2012/0236162 A1* | 9/2012 | Imamura | H04N 5/23258 |
| | | | 348/207.99 |
| 2013/0010170 A1* | 1/2013 | Matsuzawa | G06F 3/041 |
| | | | 348/333.01 |
| 2013/0229439 A1* | 9/2013 | Freyhult | G06F 3/0481 |
| | | | 345/661 |
| 2014/0139547 A1* | 5/2014 | Weiss | H04N 1/628 |
| | | | 345/594 |
| 2015/0172534 A1* | 6/2015 | Miyakawa | H04N 5/23216 |
| | | | 348/222.1 |
| 2016/0366343 A1* | 12/2016 | Mishio | H04N 5/2621 |

\* cited by examiner

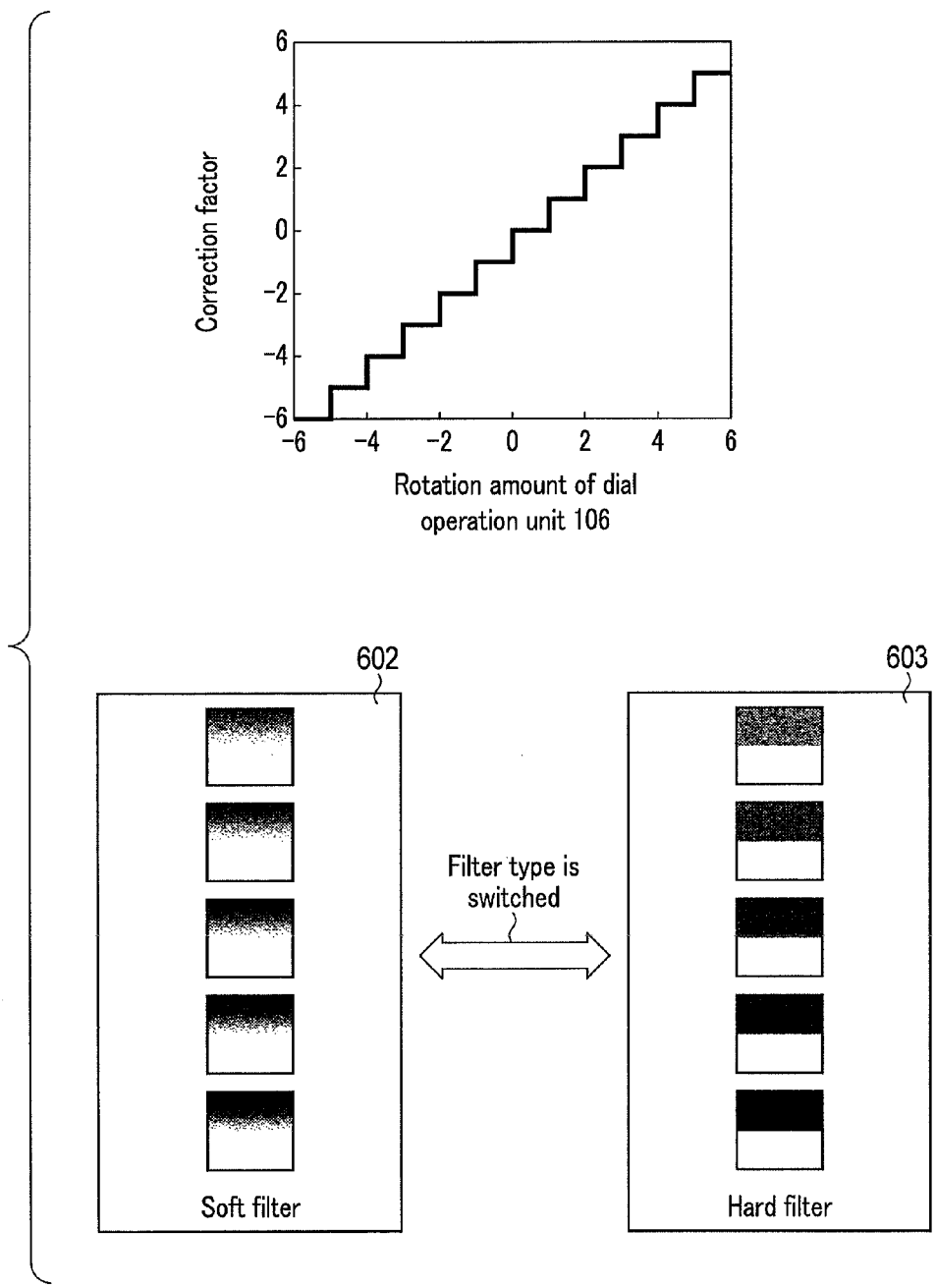
F I G. 6

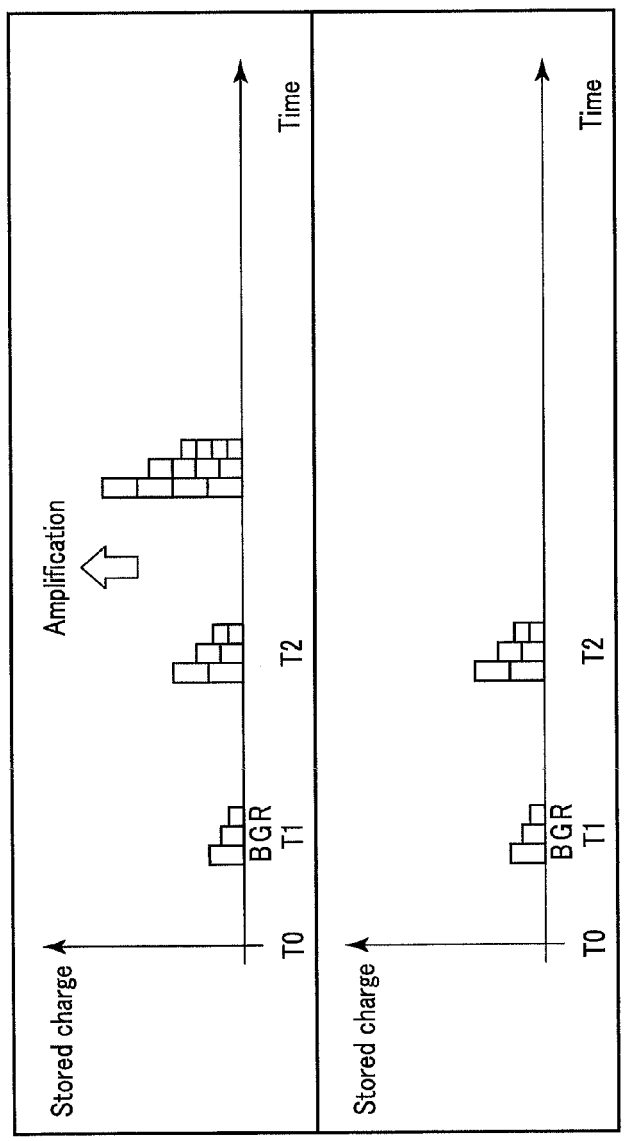
F I G. 11

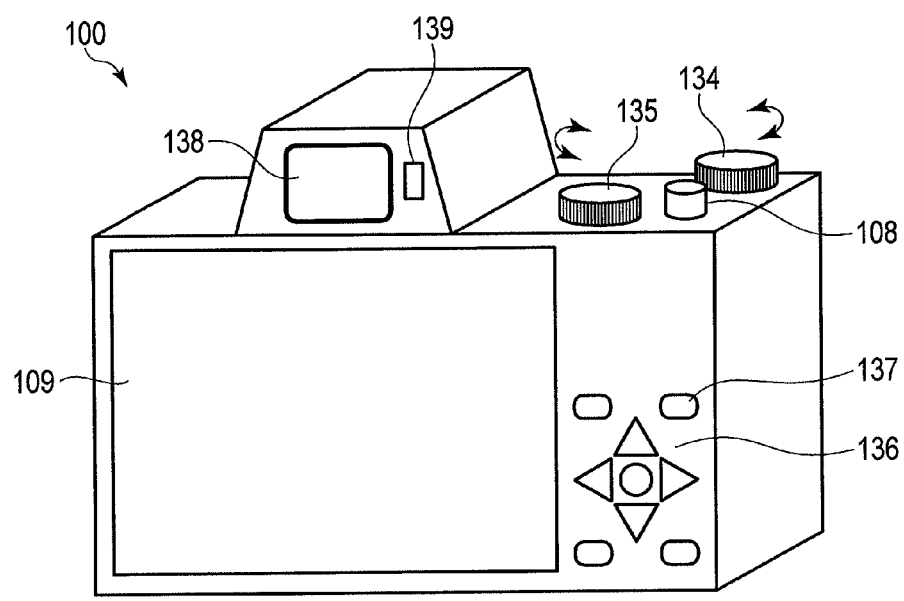
F I G. 13A

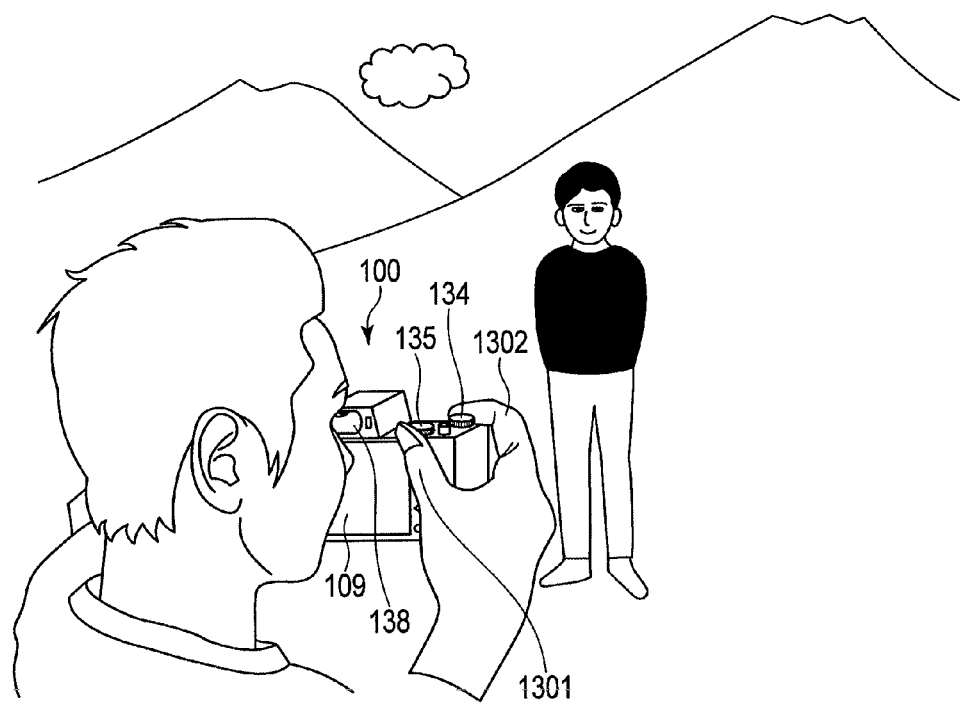
F I G. 13B

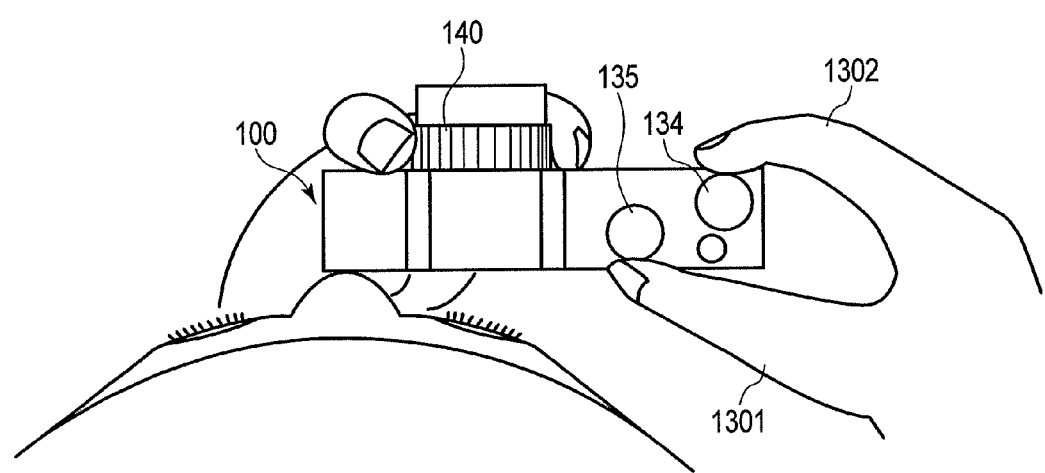
F I G. 13C

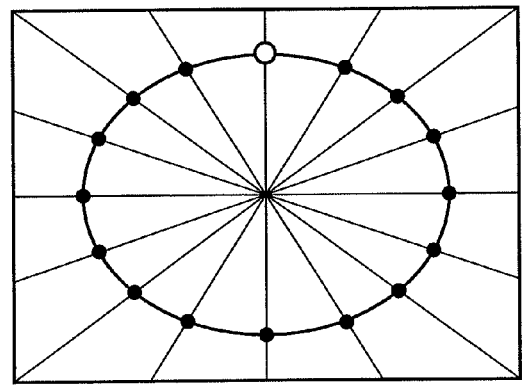
F I G. 20A
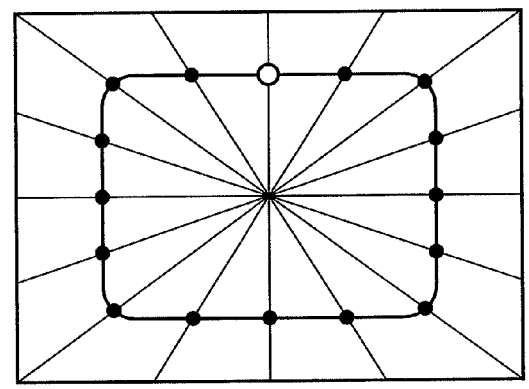
F I G. 20B
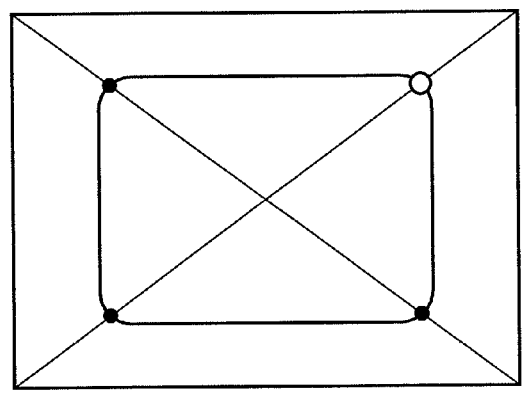
F I G. 20C

IMAGING APPARATUS, CONTROL METHOD OF IMAGING APPARATUS, AND NON-TRANSITORY STORAGE MEDIUM STORING CONTROL PROGRAM OF IMAGING APPARATUS

CROSS-REFERENCE TO RELATED APPLICATIONS

This application is based upon and claims the benefit of priority from the Japanese Patent Applications No. 2015-067719, filed Mar. 27, 2015, and No. 2015-122209, filed Jun. 17, 2015 the entire contents of both of which are incorporated herein by reference.

BACKGROUND OF THE INVENTION

1. Field of the Invention

The present invention relates to an imaging apparatus, a control method of an imaging apparatus, and a non-transitory storage medium storing a control program of an imaging apparatus.

2. Description of the Related Art

Jpn. Pat. Appln. KOKAI Publication No. 54-130121 discloses an imaging apparatus capable of partly adjusting the light amount and colors in a taken image without the replacement of filters owing to a filter unit having a special structure. According to Jpn. Pat. Appln. KOKAI Publication No. 54-130121, a flat neutral-density (ND) half filter is slid or rotated to partly adjust the light amount and colors in the taken image.

BRIEF SUMMARY OF THE INVENTION

According to a first aspect of the invention, there is provided an imaging apparatus comprising: an imaging processing unit which acquires image data having a predetermined image effect; a dial operation unit which receives a dial operation to set at least one boundary line in the image data; a boundary setting unit which sets the boundary line in the image data in response to the dial operation; and a control unit which controls the imaging processing unit so that image data having different image effects are obtained in the respective partial regions of the image data that are divided by the boundary line set by the boundary setting unit.

According to a second aspect of the invention, there is provided a control method of an imaging apparatus comprising: receiving a dial operation by a dial operation unit to set at least one boundary line in image data; setting the boundary line in the image data in response to the dial operation; and controlling an imaging processing unit so that image data having different image effects are obtained in the respective partial regions of the image data that are divided by the set boundary line.

According to a third aspect of the invention, there is provided a computer-readable non-transitory storage medium to record a program to cause a computer to: receive a dial operation by a dial operation unit to set at least one boundary line in image data; set the boundary line in the image data in response to the dial operation; and control an imaging processing unit so that image data having different image effects are obtained in the respective partial regions of the image data that are divided by the set boundary line.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

FIG. 6 is a diagram illustrating the relation between the rotation amount of a dial operation unit 106, the correction factor, and the filter effect by the imaging apparatus according to the first embodiment of the present invention;

FIG. 11 is a diagram illustrating details of the filter processing in the imaging apparatus according to the second embodiment of the present invention;

FIG. 13A is a diagram showing the exterior of the imaging apparatus according to the third embodiment of the present invention;

FIG. 13B is a diagram showing the exterior of the imaging apparatus according to the third embodiment of the present invention;

FIG. 13C is a diagram showing a modification of the imaging apparatus according to the third embodiment of the present invention;

FIG. 20A is a diagram showing a modification of the third embodiment;

FIG. 20B is a diagram showing a modification of the third embodiment; and

FIG. 20C is a diagram showing a modification of the third embodiment.

DETAILED DESCRIPTION OF THE INVENTION

Hereinafter, embodiments of the present invention will be described in detail by way of example with reference to the drawings. Components described in the embodiments below are illustrative only, and the technical scope of the present invention is not limited to the illustration.

First Embodiment

Figure 1:
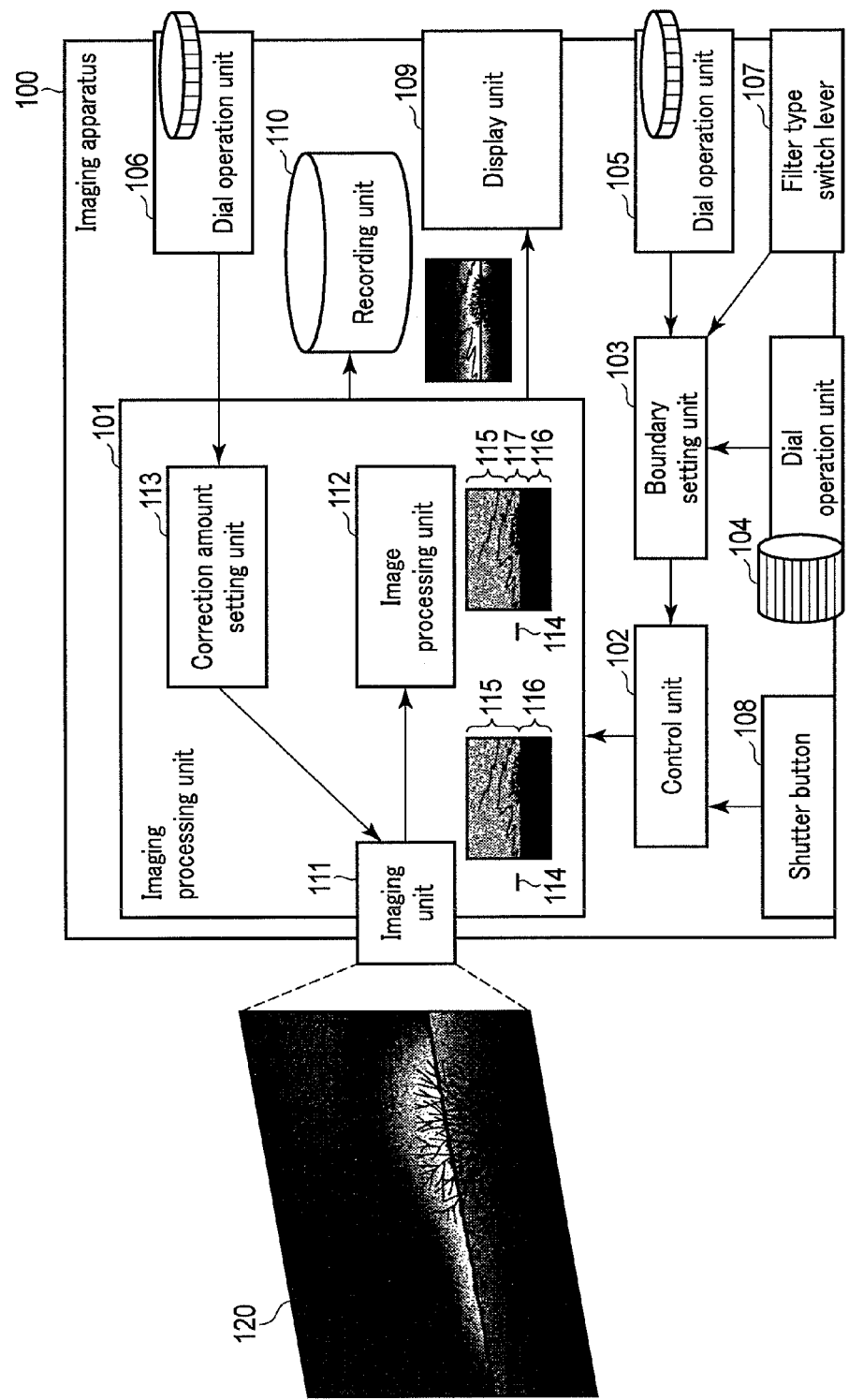
FIG. 1 is a block diagram showing the configuration of the imaging apparatus according to a first embodiment of the present invention.

FIG. 1 is a block diagram showing the configuration of the imaging apparatus according to a first embodiment of the present invention. As shown in FIG. 1, an imaging apparatus 100 includes an imaging processing unit 101, a control unit 102, a boundary setting unit 103, dial operation units 104, 105, and 106, a filter type switch lever 107, a shutter button 108, a display unit 109, and a recording unit 110.

The imaging processing unit 101 is a processing circuit including an imaging unit 111, an image processing unit 112, and a correction amount setting unit 113. Here, the function of a part of the imaging processing unit 101 may be configured by software. The imaging unit 111 includes a photography lens, and an image pickup device such as a CCD sensor or a CMOS sensor. The imaging unit 111 generates an image signal which is an analog signal corresponding to the image of a subject 120 on the basis of light entering from the subject 120. The image processing unit 112 subjects an image signal obtained in the imaging unit 111 to various kinds of image processing. The processing includes analog processing such as amplification processing and attenuation processing. The processing also includes processing for converting the analog-processed image signal into image data which is a digital signal. The processing further includes digital processing such as a white balance correction, a highlight and shadow correction, a contrast correction, and a hue and saturation correction. The imaging processing unit 101 includes the correction amount setting unit 113. The correction amount setting unit 113 sets a correction amount for the exposure amount of the imaging unit 111 in response to the operation of the dial operation unit 106.

The control unit 102 is a controller including a CPU and a memory, and controls the operation of the imaging processing unit 101. For example, the control unit 102 controls the operation of the imaging processing unit 101 in accordance with the selection of a half filter mode by a user so that image data having image effects differing between a partial region 115 and a partial region 116 which are separated by a boundary line 114 set in the image data will be acquired. The image effects include a half filter effect. The half filter effect is an effect similar to that in an image which is obtained when a half filter such as an ND half filter is attached. When an image is subjected to the half filter effect, the brightness and colors in the partial regions in the image are adjusted.

The boundary setting unit 103 is a processing circuit configured to set a boundary line in the image data in response to an instruction to set a boundary line by the operations of the dial operation units 104 and 105, and inform the control unit 102 of information regarding the set boundary line as a filter parameter. The boundary setting unit 103 may be configured by software.

The dial operation units 104, 105, and 106 are operation units which receive rotation operations by the user. The filter type switch lever 107 is a lever which receives an operation by the user. The shutter button 108 is a button which receives a push operation by the user.

The dial operation unit 104 instructs the boundary setting unit 103 to rotate the boundary line 114, for example, around the center of the boundary line 114 when the dial operation unit 104 is rotated by the user. The dial operation unit 105 instructs the boundary setting unit 103 to change the position of the boundary line 114 when the dial operation unit 105 is rotated by the user. The dial operation unit 106 instructs the correction amount setting unit 113 to change the correction factor when the dial operation unit 106 is rotated by the user. The filter type switch lever 107 instructs the boundary setting unit 103 to switch the filter type when the filter type switch lever 107 is operated by the user. Setting of the boundary line will be described in detail later. The shutter button 108 instructs the control unit 102 to start photography when the shutter button 108 is operated by the user.

The display unit 109 is provided, for example, on the backside of the body of the imaging apparatus 100. This display unit 109 is, for example, a liquid crystal display, and displays an image based on the image data acquired in the imaging processing unit 101. The display unit 109 displays the boundary line 114 so that the boundary line 114 can be visually recognized by the user. A touch panel may be formed in the display unit 109.

The recording unit 110 is, for example, a flash memory, and records an image based on the image data acquired in the imaging processing unit 101.

Figure 2:
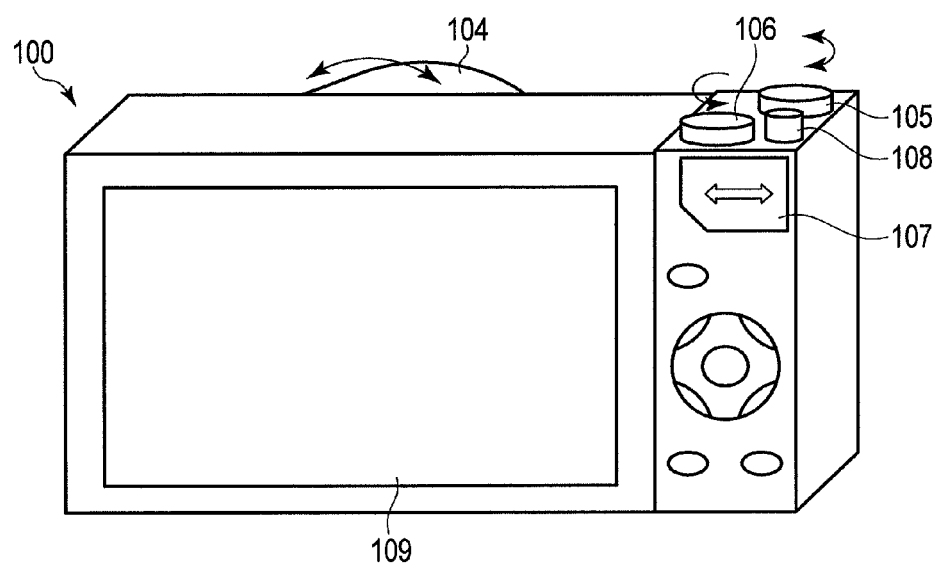
FIG. 2 is a diagram showing the exterior of the imaging apparatus according to the first embodiment of the present invention.

FIG. 2 is a diagram showing the exterior of the imaging apparatus 100. The imaging apparatus 100 in FIG. 2 as an example is a general digital camera. FIG. 2 shows the exterior of the imaging apparatus 100 seen from the user when the user holds the imaging apparatus 100. The arrangement of the operation units shown in FIG. 2 is illustrative only. Each of the operation units may be disposed in any manner.

If the side seen from the user when the user holds the imaging apparatus 100 is the backside of the imaging apparatus 100, the photography lens is directed forward and the display unit 109 is directed backward when the user holds the imaging apparatus 100. In this state, the user performs photography looking at the image displayed on the display unit 109.

In FIG. 2, the dial operation unit 104 is, for example, a versatile ring provided around the photography lens. The dial operation units 105 and 106 are provided, for example, on the right side of the upper surface of the body of the imaging apparatus 100. The filter type switch lever 107 is provided, for example, on the upper right part of the backside of the body of the imaging apparatus 100. The shutter button 108 is provided, for example, on the right side of the upper surface of the body of the imaging apparatus 100. The rotatable direction of each of the dial operation units 104, 105, and 106 is indicated by an arrow.

Figure 3:
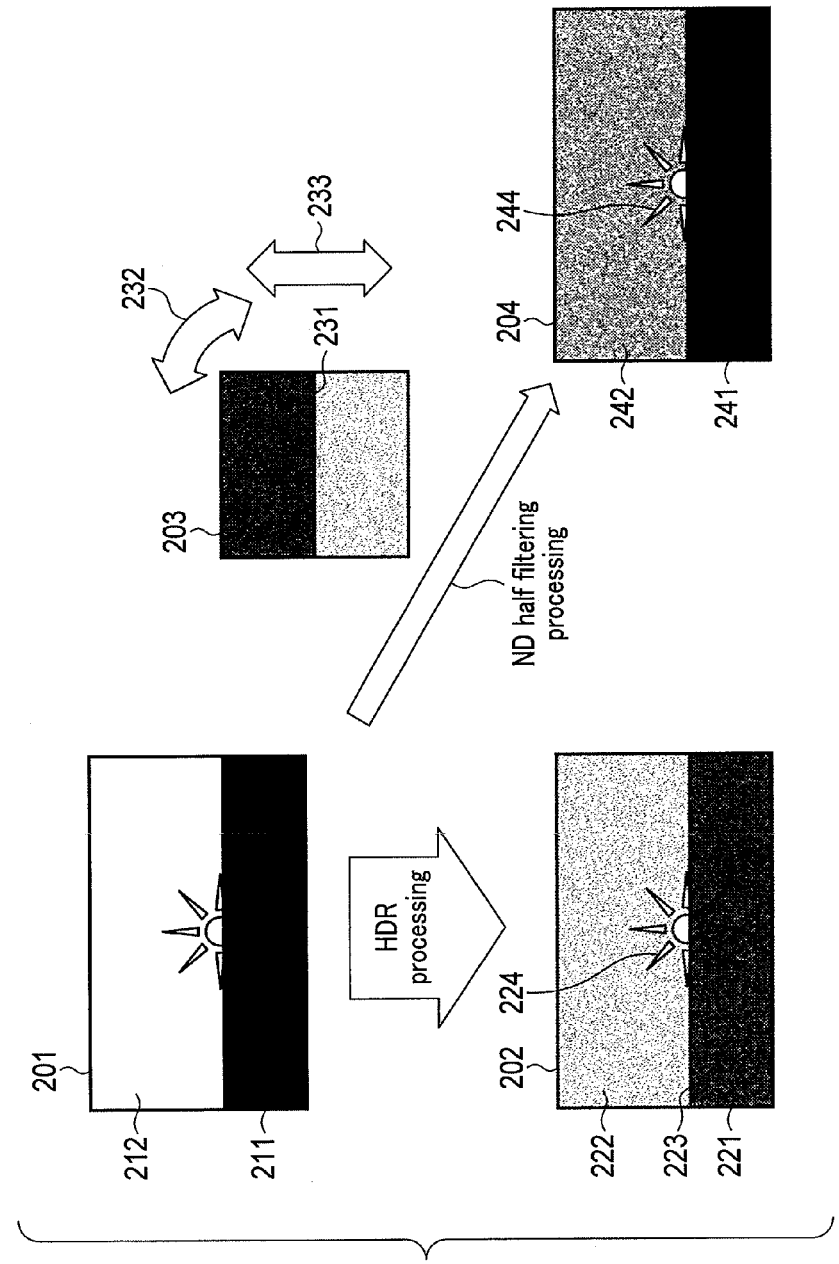
FIG. 3 is a diagram showing the overview of image processing by the imaging apparatus according to the first embodiment of the present invention.

Now, the operation of the imaging apparatus 100 is described. FIG. 3 is a diagram illustrating the operation of the imaging apparatus according to the present embodiment. In the case of the operation of the imaging apparatus 100 described here, the user is to photograph, as a subject, the sun which is present on the horizon between the sea and the sky.

If the exposure is decided in the scene shown in FIG. 3 in accordance with the part of a sea 211 as shown in an image 201, the brightness in the part of the sea 211 will be proper, but the part of a sky 212 will be too bright. If the exposure is decided in accordance with the part of the sky 212, the brightness in the part of the sky 212 will be proper, but the part of the sea 211 will be too dark. If the dynamic range is simply increased by high dynamic range (HDR) processing, the brightness will be suppressed and a gradation is expressed in the part of a sky 222, but the part of a sea 221 will be brighter than original, as shown in an image 202. In such an image, the dark part is loose, so that the gradation of the colors of a sun 224 which is present on a horizon 223 between the sky 222 and the sea 221 does not appear in the image.

A method that uses an ND half filter 203 is known as a method of suppressing the brightness of a particular part in the image. The ND half filter 203 is a filter which has a bright region and a dark region across a boundary line 231 and which is configured to reduce incident light in the dark region.

In the present embodiment, the effect similar to that when the ND half filter 203 is used is obtained without the use of the ND half filter 203. ND half filters of a hard type and a soft type are known. The ND half filter of the hard type is a filter which has a clear boundary between the bright region and the dark region. The ND half filter of the soft type is a filter which has no clear boundary between the bright region and the dark region. In the present embodiment, the effects of the hard type and the soft type are switched during an ND half filter mode.

As specific processing in the present embodiment, the user operates the filter type switch lever 107 to switch the filter type to the hard type or the soft type. The user aligns the position of the boundary line 231 with the position of the horizon in the image by operating the dial operation unit 104 to rotate the boundary line 231 in the direction of an arrow 232 while looking at the image displayed on the display unit 109 or by operating the dial operation unit 105 to move the boundary line 231 in the direction of an arrow 233. Further, the user operates the dial operation unit 106 to change the correction factor.

In response to the operations of the dial operation units 104 and 105, the boundary setting unit 103 changes the setting of the boundary line. In response to the operation of the dial operation unit 106, the correction amount setting unit 113 sets a correction amount for the imaging unit 111. The setting of the boundary line and the setting of the correction amount are described below.

Figure 4:
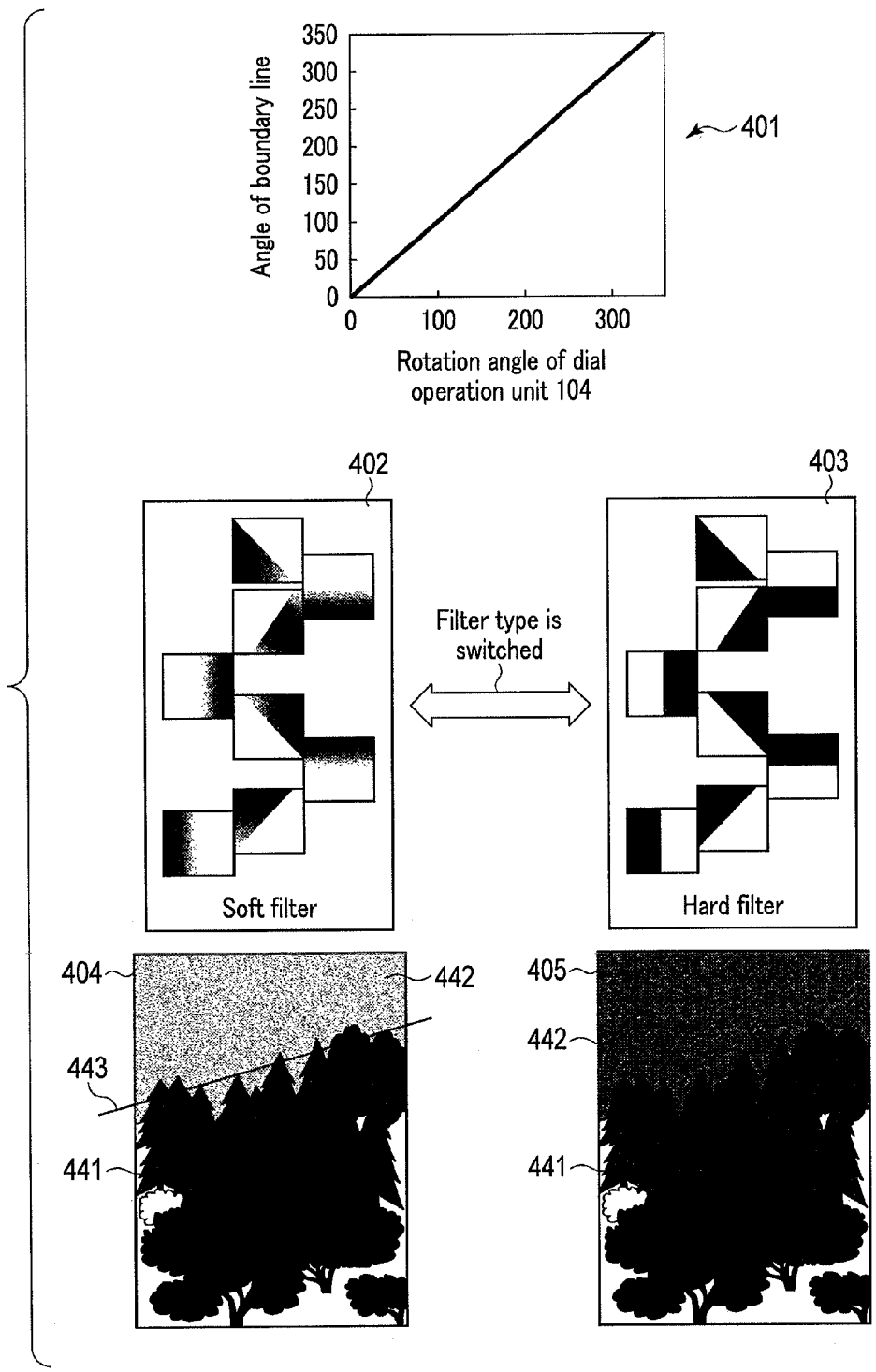
FIG. 4 is a diagram illustrating the relation between the rotation angle of a dial operation unit 104, the angle of a boundary line, and the filter effect by the imaging apparatus according to the first embodiment of the present invention.

FIG. 4 is a diagram showing the relation between the rotation angle of the dial operation unit 104, the angle (inclination) of the boundary line, and the filter effect. As shown in an upper graph 401, the angle of the boundary line linearly changes in accordance with the rotation angle of the dial operation unit 104. In response to the angular change of the boundary line, the effect of filter processing changes as indicated by effects 402 and 403. The directions of the bright region and the dark region change with the rotation of the boundary line. The effect 402 represents an example of an effect in the case where the soft type is selected. The effect 403 represents an example of an effect in the case where the hard type is selected. As described above, the soft type has no clear boundary provided between the bright region and the dark region, and the hard type has a clear boundary provided between the bright region and the dark region.

For example, the inclination angle of a boundary line 443 is adjusted to a mountain 441 when the color of a blue sky 442 beyond the mountain 441 is not seen blue due to brightness as shown in an image 414. In this case, an image in which the blueness of the blue sky 442 is enhanced can be obtained without the change of the brightness in the region of the mountain 441 by the application of the filter effect, as shown in an image 405.

In the present embodiment, if the user operates the versatile ring (dial operation unit 104) provided around the photography lens with the finger of the left hand, the operation by the user is reflected as it is in the angle (inclination) of the boundary line, as shown in FIG. 4. Such an operation of the versatile ring is an operation which provides a feeling 5: similar to actually rotating an optical filter to change the angle of the boundary line of the ND half filter. Thus, the user can intuitively perform the operation. The user can operate the versatile ring while holding the imaging apparatus 100. This prevents camera shaking. When, for example, one round of the versatile ring is made, slight camera shaking can occur. Therefore, it may be designed so that a slight rotation of the versatile ring produces many rotations of the boundary line during exposure or during a correction without the need for one rotation of the versatile ring.

Figure 5:
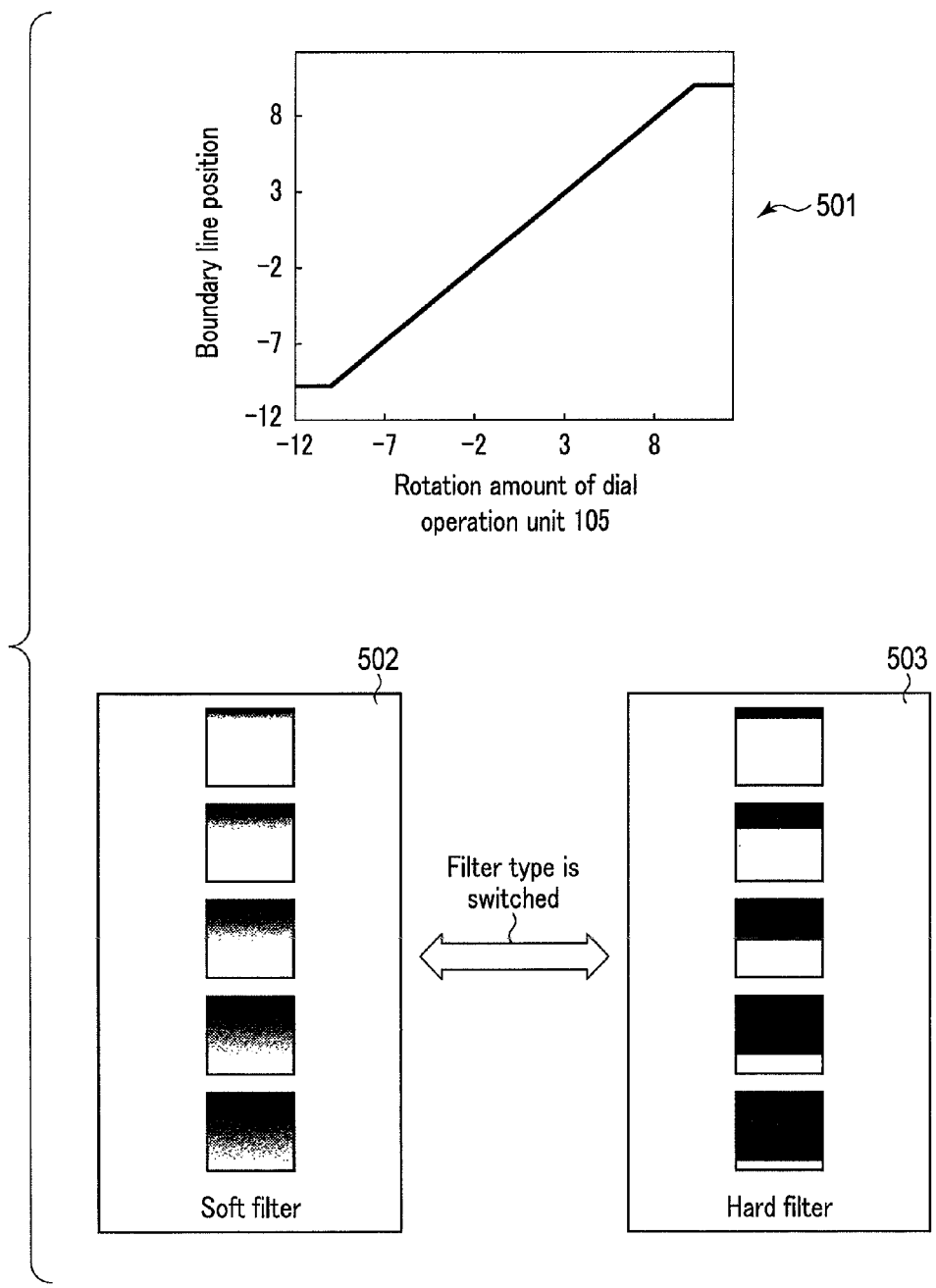
FIG. 5 is a diagram illustrating the relation between the rotation amount of a dial operation unit 105, the position of the boundary line, and the filter effect by the imaging apparatus according to the first embodiment of the present invention.

FIG. 5 is a diagram showing the relation between the rotation amount of the dial operation unit 105, the position of the boundary line, and the filter effect. The rotation amount of the dial operation unit 105 indicated by the horizontal axis in FIG. 5 indicates predetermined rotation angle. If this predetermined rotation angle is, for example, 10°, the rotation amount increases one by one whenever the dial operation unit 105 rotates 10°. The boundary line position indicated by the vertical axis in FIG. 5 corresponds to the position from the origin of the boundary line. The position of the origin is changed in accordance with, for example, the posture of the imaging apparatus. As shown in an upper graph 501, the position of the boundary line linearly changes in accordance with the rotation amount of the dial operation unit 105. In response to the movement of the boundary line, the effect of filter processing changes as indicated by effects 502 and 503. The area ratio between the bright region and the dark region changes with the movement of the boundary line. The effect 502 represents an example of an effect in the case where the soft type is selected. The effect 503 represents an example of an effect in the case where the hard type is selected. In contrast with the case of rotation, the range in which the boundary line can move is limited, so that the position of the boundary line is not changed by a rotation amount equal to or more than a certain rotation amount in FIG. 5. In this way, the user does not mistake the rotation direction of the dial operation unit 105. Thus, the switch of the rotation direction facilitates successive trial and error. When the rotation amount is not regulated, the relation between the rotation amount and a control amount of, for example, the boundary can be freely set. This facilitates fine tuning and rough tuning, and is thus advantageous to a delicate operation. Particularly when, for example, a position in a screen is designated, selections in a wide range and a narrow range and a fine adjustment therein are needed. A dial operation is advantageous to a quick response to such a situation. As required, rough-tuning and fine-tuning dials may be separately provided, or the same dial may provide different operations by, for example, a switch.

FIG. 6 is a diagram showing the relation between the rotation angle of the dial operation unit 106, the correction factor of the filter, and the filter effect. The rotation amount of the dial operation unit 106 indicated by the horizontal axis in FIG. 6 corresponds to the predetermined rotation angle. If this predetermined rotation angle is, for example, 10°, the rotation amount increases one by one whenever the dial operation unit 106 rotates 10°. The correction factor indicated by the vertical axis in FIG. 6 corresponds to the correction amount of the exposure amount. For example, a correction factor 0 indicates one time, at which the correction amount does not change. The correction amount doubles if the correction factor increases by one. The correction amount is halved if the correction factor decreases by one. Such a correction amount is multiplied by the exposure amount obtained in the imaging unit 111 to correct the exposure amount. As shown in an upper graph 601, the correction factor changes in stages in accordance with the rotation amount of the dial operation unit 106. In response to the changes of the correction factor, the effect of the filter processing changes as indicated by effects 602 and 603. For example, the density of the filter decreases if the correction factor increases. Accordingly, the light reduction amount in the part to be filtered decreases. The effect 602 represents an example of an effect in the case where the soft type is selected. The effect 603 represents an example of an effect in the case where the hard type is selected. In the example of FIG. 6, the correction factor changes in stages in accordance with the operation of the dial operation unit 106. The intention is to suit to the feeling of the use of a filter such as a general optical filter in which the light amount changes to ½, ¼, and ⅛. The correction factor may be configured to be exponentially changeable. Otherwise, the color of the filter processing may be configured to be changeable by the combination of the dial operation unit 106 and some other button. In this way, it is possible to obtain an image in which the exposure of a particular color alone is suppressed.

In the example according to the present embodiment, when the user holds the imaging apparatus 100 with the first finger of the right hand put on the shutter button 108 of the imaging apparatus 100, the user can operate the dial operation unit 105 with the first finger of the right hand and operate the dial operation unit 106 and the filter type switch lever 107 with the thumb of the right hand. Thus, the user can concentrate on the photography.

Figure 7:
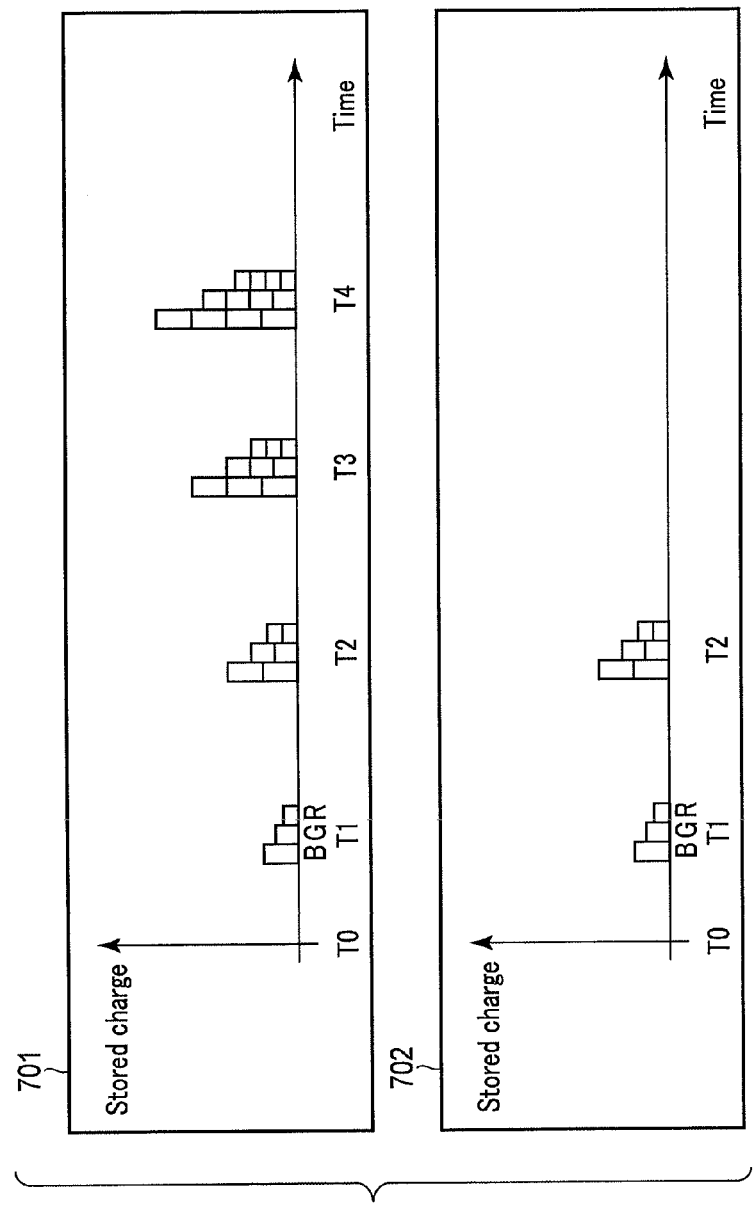
FIG. 7 is a diagram illustrating details of filter processing in the imaging apparatus according to the first embodiment of the present invention.

If a boundary line is set by the user and the shutter button 108 is pressed, the imaging processing unit 101 performs photography to apply the half filter effect to the image. FIG. 7 is a diagram illustrating the setting of an exposure amount as half filter processing by the imaging processing unit 101. The horizontal axis in this drawing indicates time, and the vertical axis indicates the accumulated charge amount. In FIG. 7, the accumulated charge amount of each pixel of BGR is separately shown. FIG. 7 shows an example of an imaging operation of the hard type.

As the half filter processing, the imaging processing unit 101 successively (substantially simultaneously) performs two imaging actions different in exposure time, as shown in an upper side 701 and a lower side 702 in FIG. 7. The exposure times in the two imaging actions are set by the correction amount determined by the correction factor. For example, the correction amount is greater when the correction factor is higher. Therefore, the imaging processing unit 101 increases the exposure time in the second imaging.

After the imaging, the imaging processing unit 101 respectively cuts out necessary partial regions from two images, and composes the cut-out partial regions. For example, in the example of FIG. 3, even if the partial region that is not the sky is exposed up to a time T4, none of BGR is saturated, so that the image at the exposure time T4 shown in the upper side 701 is cut out. In contrast, the partial region of the sky needs to be darkened, so that the image at an exposure time T2 shown in the lower side 702 is cut out. This is, so to speak, a way of thinking in which an area is designated by the designation of a boundary line with the dial operation unit in HDR processing.

As a result of such composition processing, the brightness is suppressed and the gradation is expressed in the part of a sky 242, and the brightness in the part of a sea 241 does not change, as shown in an image 204 in FIG. 3.

In the example of FIG. 7, two imaging actions at the exposure time T4 and the exposure time T2 are performed. In contrast, two imaging actions from a time T0 to the time T2 and from the time T2 to the time T4 may be performed. In this case, the images obtained by the two imaging actions are added to the partial region to be brightened, and the image obtained by only one of the imaging actions is used for the partial region to be darkened, and then the images in the respective partial regions are composed. The method of composition may be changed by a dial.

Instead of merely changing the exposure time, an image signal may be amplified or attenuated before composition. For example, the soft type is processed so that the brightness gradually changes in the boundary part. The brightness in this boundary part may be set by the amplification and attenuation processing.

Figure 8:
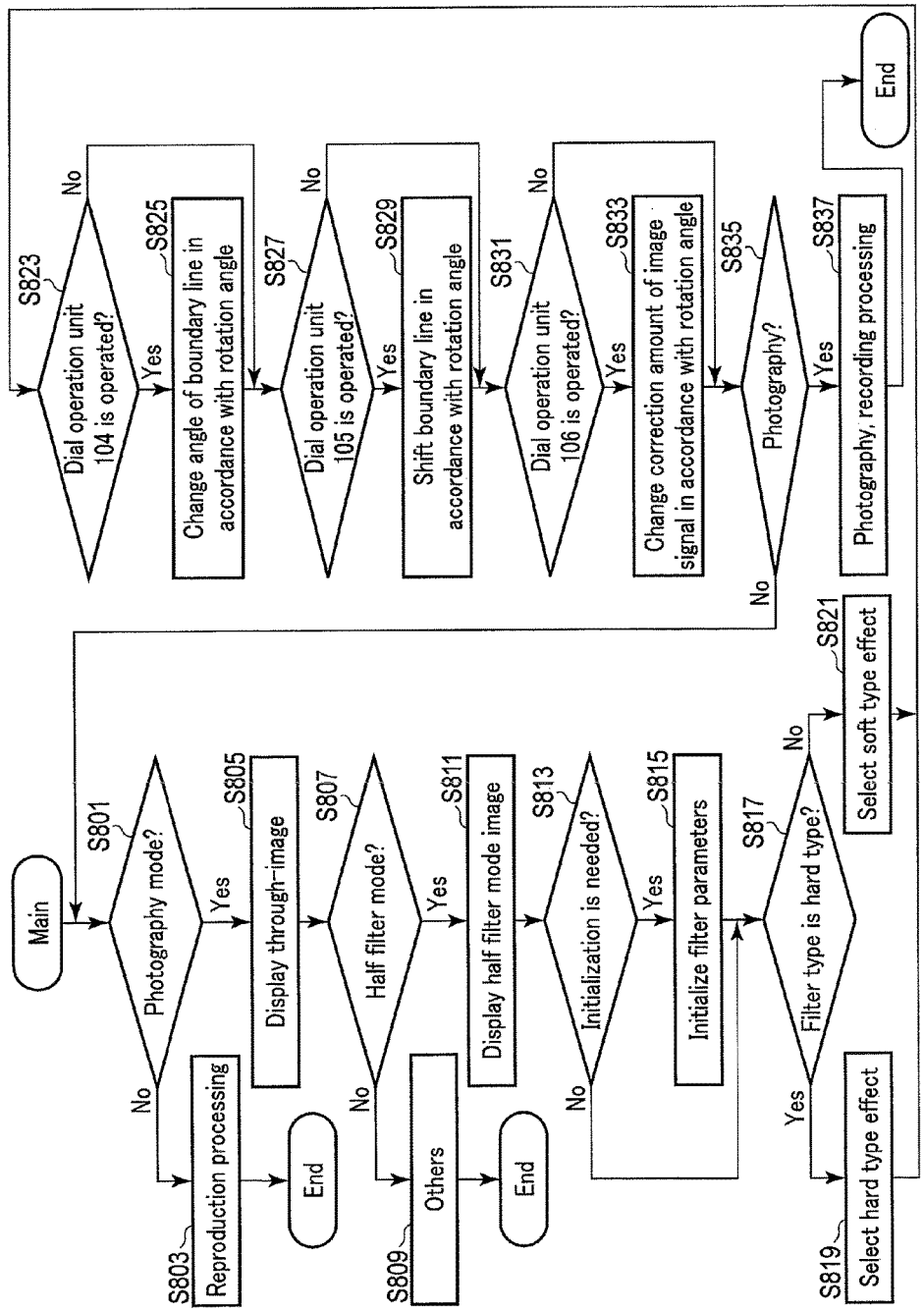
FIG. 8 is a flowchart showing processing in the imaging apparatus according to the first embodiment of the present invention.

FIG. 8 is a flowchart illustrating the flow of specific processing in the half filter mode by the imaging apparatus 100.

In step S801, the imaging apparatus 100 determines whether the operation mode is a photography mode. In the case of the photography mode, the processing proceeds to step S803. In step S803, the imaging apparatus 100 performs reproduction processing. Details of the reproduction processing are not described. After the end of the reproduction processing, the processing in FIG. 8 is finished.

In the case of the photography mode, the processing proceeds to step S805. In step S805, the imaging apparatus 100 displays a through-image. In step S807, the imaging apparatus 100 determines whether the photography mode is set to the half filter mode. When the photography mode is not set to the half filter mode, the processing proceeds to step S809. In step S809, the imaging apparatus 100 performs other processing. The other processing includes, for example, normal photography processing that does not apply the filter effect. Details of the normal photography processing are not described. After the end of the other processing, the processing in FIG. 8 is finished.

When the photography mode is set to the half filter mode, the processing proceeds to step S811. In step S811, the imaging apparatus 100 displays a half filter mode image as a through-image. The half filter mode image in step S811 is an image obtained by half filter processing in which previously set parameters of the filter processing (e.g. the angle of the boundary line, the position of the boundary line, and the correction amount) are used.

In step S813, the imaging apparatus 100 determines whether the parameters of the filter processing need to be initialized. For example, the imaging apparatus 100 determines that the initialization is needed at the start of the user operation or at the time of a redoing operation. When the initialization is needed, the processing proceeds to step S815. In step S815, the imaging apparatus 100 initializes the parameters of the filter processing (e.g. the angle of the boundary line, the position of the boundary line, and the correction amount). When the initialization is not needed, the processing proceeds to step S817. In this case, the parameters of the filter processing (e.g. the angle of the boundary line, the position of the boundary line, and the correction amount) are not initialized because, for example, a continuous operation is performed. Thus, the previous operation is reflected in the next half filter processing.

In step S817, the imaging apparatus 100 determines whether the filter type switch lever 107 is in a state to select the hard type. When the filter type switch lever 107 is in a state to select the hard type, the processing proceeds to step S819. In step S819, the imaging apparatus 100 selects the effect of the hard type, and switches the half filter mode image displayed as the through-image to the hard type. On the contrary, When the filter type switch lever 107 is in a state to select the soft type, the processing proceeds to step S821. In step S821, the imaging apparatus 100 selects the effect of the soft type, and switches the half filter mode image displayed as the through-image to the soft type. Owing to the determination in step S817, the user can instantaneously compare the effect of the hard type with the effect of the soft type merely by the operation of the filter type switch lever 107. Such an instantaneous switch is difficult in the case of the replacement of optical filters. The user can instantaneously compare the effect of the hard type with the effect of the soft type, so that a burden on the user is considerably reduced. Successive photography also becomes possible.

In step S823, the imaging apparatus 100 determines whether the dial operation unit 104 has been operated. When the dial operation unit 104 has not been operated, the processing proceeds to step S827. When the dial operation unit 104 has been operated, the processing proceeds to step S825. In step S825, the imaging apparatus 100 changes the angle of the boundary line in accordance with the rotation angle of the dial operation unit 104. The processing then proceeds to step S827. As described above, the dial operation unit 104 is a dial provided around the photography lens. Therefore, the operation of the dial operation unit 104 provides a feeling of use similar to that of the optical filer. The imaging apparatus 100 may be configured to automatically change the angle of the boundary line with reference to the output of a digital level in the case of changing the angle of the boundary line.

In step S827, the imaging apparatus 100 determines whether the dial operation unit 105 has been operated. When the dial operation unit 105 has not been operated, the processing proceeds to step S831. When the dial operation unit 105 has been operated, the processing proceeds to step S829. In step S829, the imaging apparatus 100 moves the position of the boundary line in accordance with the rotation angle (rotation amount) of the dial operation unit 105. This increases the degree of freedom in composition.

In step S831, the imaging apparatus 100 determines whether the dial operation unit 106 has been operated. When the dial operation unit 106 has not been operated, the processing proceeds to step S835. When the dial operation unit 106 has been operated, the processing proceeds to step S833. In step S833, the imaging apparatus 100 changes the correction amount on the basis of the correction factor which is set in accordance with the rotation angle (rotation amount) of the dial operation unit 106. As a result, it is possible to easily set the optimum filter effect regardless of a luminance difference between scenes.

In step S835, the imaging apparatus 100 determines whether a photography operation has been performed. The photography operation is, for example, the operation of the shutter button 108. When the photography operation has not been performed, the processing returns to step S801. When the photography operation has been performed, the processing proceeds to step S837. In step S837, the imaging apparatus 100 takes a half filter mode image in accordance with the currently set filter parameters (e.g. the angle of the boundary line, the position, and the correction amount). The imaging apparatus 100 then records the half filter mode image obtained by the photography in the recording unit 110. The processing in FIG. 8 is finished afterwards.

As described above, according to the present embodiment, the user can enjoy the half filter effect having a high degree of freedom merely by the dial operation without the replacement of optical filters. The half filter mode image is displayed as the through-image, so that the user can perform photography while checking the effect of the half filter in real time.

Second Embodiment

Figure 9:
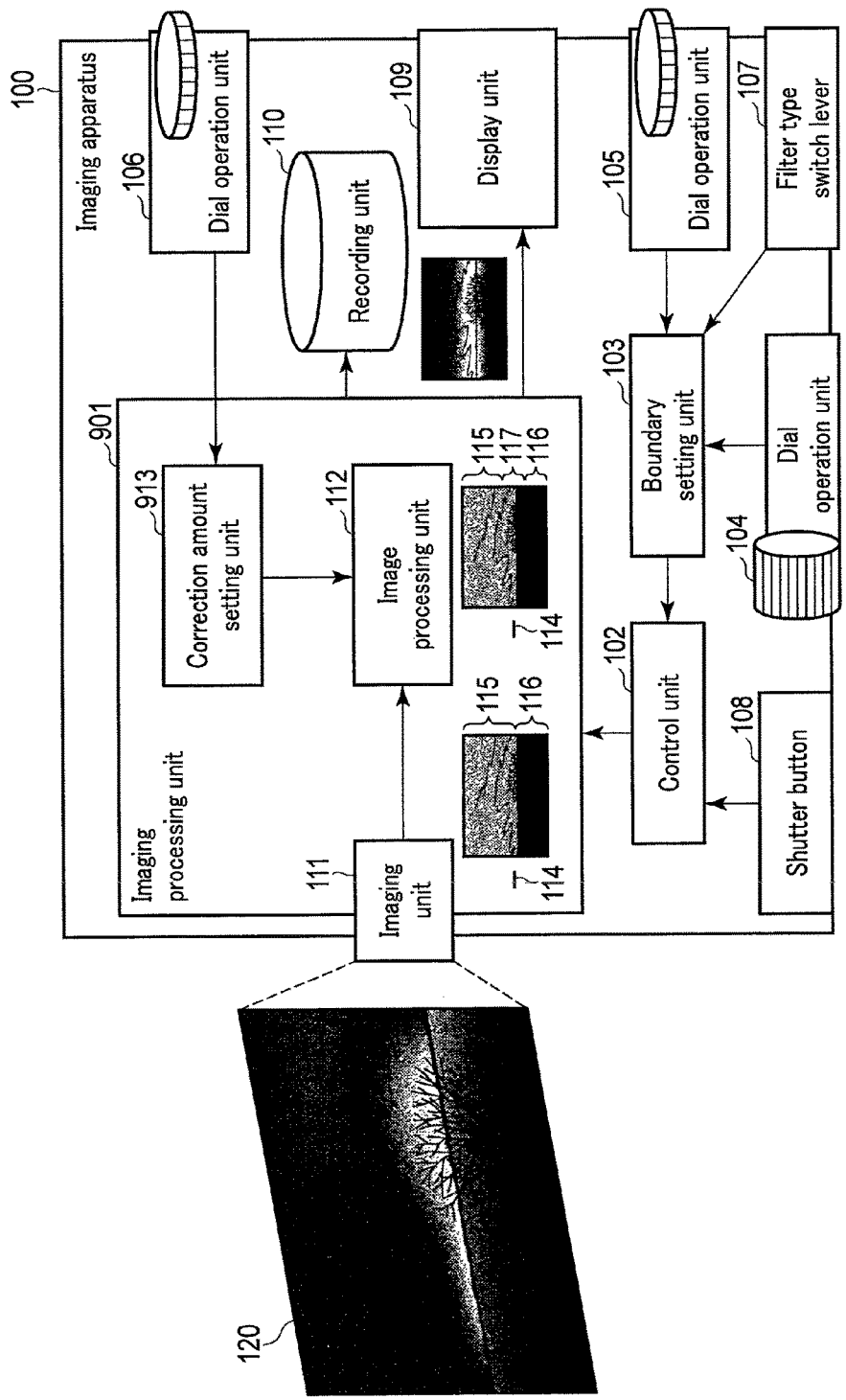
FIG. 9 is a diagram showing the configuration of the imaging apparatus according to a second embodiment of the present invention.

The imaging apparatus 100 according to the second embodiment of the present invention is described. FIG. 9 is a diagram illustrating the configuration of the imaging apparatus 100 according to the present embodiment. Components in FIG. 9 that are similar to those in FIG. 1 are provided with the same reference signs and are therefore not described in detail.

The imaging apparatus 100 includes an imaging processing unit 901. The imaging processing unit 901 corresponds to the imaging processing unit 101, and includes the imaging unit 111, the image processing unit 112, and a correction amount setting unit 913. The correction amount setting unit 913 sets an exposure correction amount in the image processing unit 112 in response to the operation of the dial operation unit 106. The image processing unit 112 according to the second embodiment performs an exposure correction as the half filter processing in accordance with the exposure correction amount set by the correction amount setting unit 913. The exposure correction is performed by attenuating or amplifying an image signal in accordance with the exposure correction amount. The brightness in the partial region in the image is changed by the exposure correction in the second embodiment, so that there is no need for HDR-like control. Thus, the second embodiment is adaptive to a moving subject. Moreover, there is no need for the composition of images, so that the image processing unit 112 can have a simpler configuration.

Figure 10:
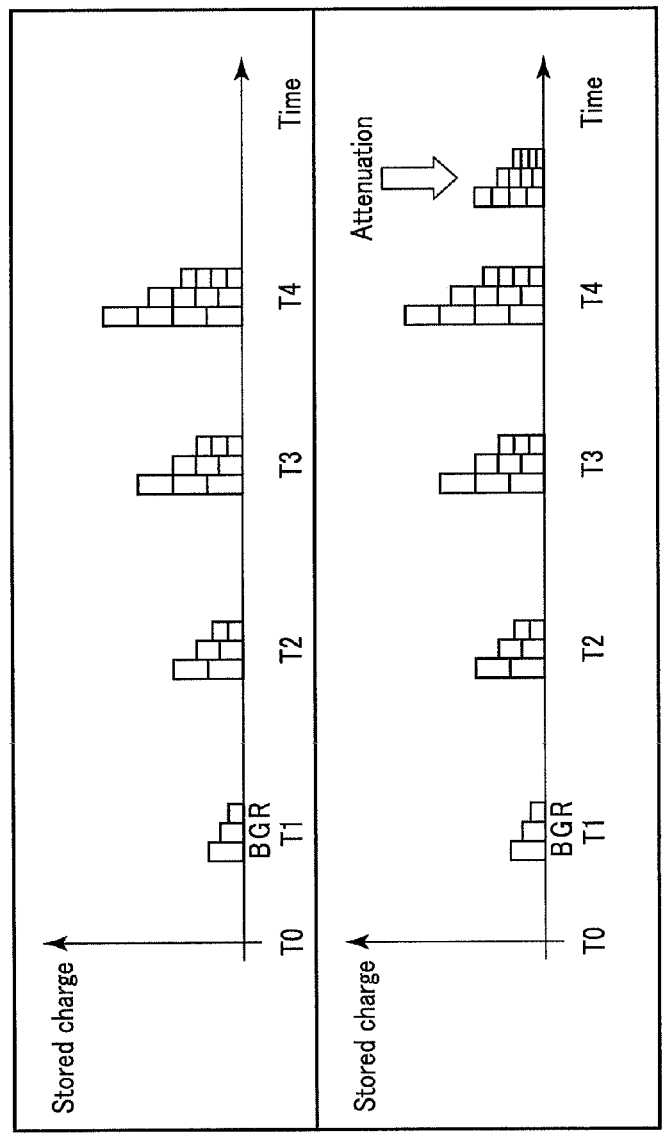
FIG. 10 is a diagram illustrating details of filter processing in the imaging apparatus according to the second embodiment of the present invention.

FIG. 10 is a diagram illustrating the attenuation processing as an example of the exposure correction. The image signal in one of the two partial regions across the boundary line can be attenuated to decrease the brightness in this partial region. Meanwhile, FIG. 11 is a diagram illustrating the amplification processing. The image signal in one of the partial regions across the boundary line can be amplified to increase the brightness in this partial region. The attenuation processing and the amplification processing may be performed by digital calculation processing or analog calculation processing.

When the filter type is set to the soft type, the boundary region between the partial regions is subjected to an exposure correction having correction intensity lower than the correction intensity of the exposure correction in the partial regions, that is, weaker attenuation processing and weaker amplification processing. The correction intensity in the partial regions may sequentially change. The exposure correction may be only performed for a particular color component as in the first embodiment. In this case, the color component targeted for the exposure correction may be changed in accordance with the rotation of one of the operation units.

As described above, according to the present embodiment, the user can enjoy an easy half filter effect having a high degree of freedom merely by the dial operation. The exposure correction is made in the image signal after imaging, which provides another advantage of needing no repeated imaging. The present embodiment is not only applicable to the ND filter but also applicable to, for example, a color filter. In this instance, the signal which has passed through each of the RGB color filters of the image pickup device may be individually processed, or image processing for only attenuating a particular color region may be used together.

Modifications of First and Second Embodiments

For example, in the first and second embodiments, boundary control of the color filter effect or ND filter effect is described. As a modification of the first and second embodiments, boundary control of other image processing effects may be enabled by the dial operation unit. For example, it is possible to change the boundary line of a diorama effect by a dial operation, or convert only one of the two partial regions across the boundary line into a black-and-white image or into an image having an increased saturation. Here, the diorama effect is an effect which changes the degree of blurring at the boundary. In the modification, this boundary line is set with a dial. It is thus possible to provide a user interface which solves the problems by digital means and which enables dedication to the creation of works by intuitive operations without any feeling different from that of the conventional camera operation and without impairment of operability.

The dial operation described so far may be partly changed to a slide operation. The advantages of the dial operation are that the initial position has a degree of freedom and that the relation between the rotation amount and the control amount can be relatively freely set. Another advantage of the dial operation is that the dial operation is also used in many conventional cameras. However, it is possible to replace the dial operation with a slide operation that uses part of a touch panel, or use a slide operation unit instead. It is possible to use any unit which can be held by the user and which can be operated merely by the movement of a finger while being firmly grasped without the change in the way of holding the camera and without camera shaking.

Although the apparatus having three dial operation units is described in the embodiment described above, three or more functions may be obtained by allocating switchable multiple functions in one dial operation unit. Naturally, when the optical filter is replaced, the angle of the boundary can be changed in a more easily understandable manner by use of the dial operation unit or ring around the photography lens than by use of the slide operation.

Third Embodiment

The imaging apparatus 100 according to the third embodiment of the present invention is described. In the third embodiment, multiple boundary lines are set, so that a closed partial region is formed in the image data. Processing for applying image effects that differ between the inside and outside of the partial region is performed. Such a photography mode will be hereinafter referred to as a partial region mode.

Figure 12:
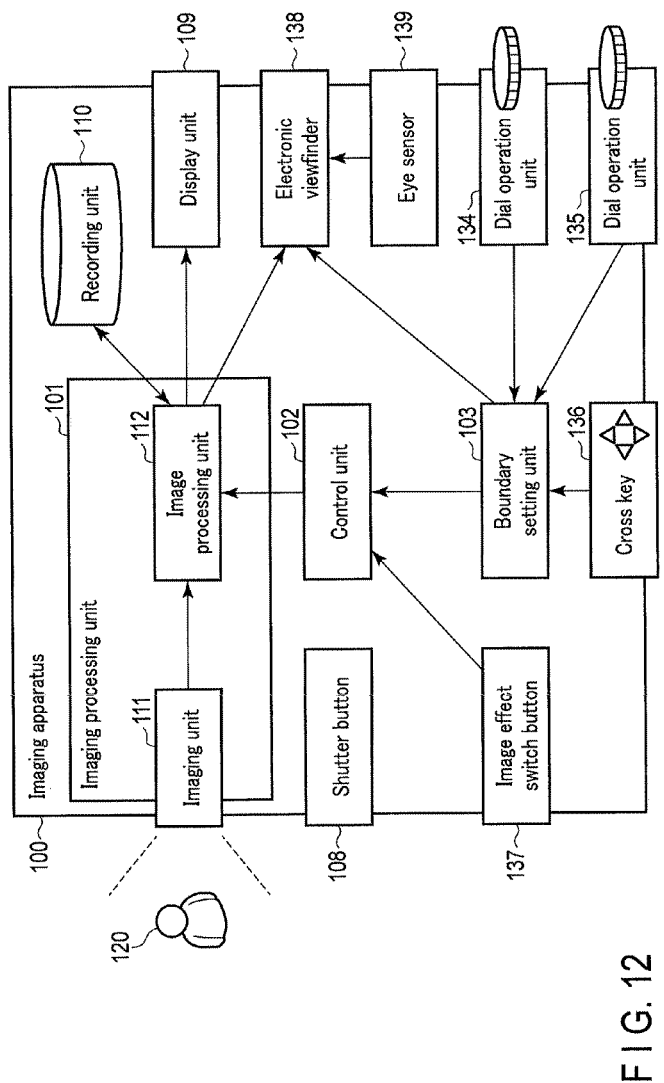
FIG. 12 is a block diagram showing the configuration of the imaging apparatus according to a third embodiment of the present invention.

FIG. 12 is a block diagram showing the configuration of the imaging apparatus 100. As shown in FIG. 12, the imaging apparatus 100 includes the imaging processing unit 101, the control unit 102, the boundary setting unit 103, the shutter button 108, the display unit 109, and the recording unit 110, as in FIG. 1. The imaging apparatus 100 also includes dial operation units 134 and 135, a cross key 136, an image effect switch button 137, an electronic viewfinder 138, and an eye sensor 139. Components in FIG. 12 equivalent to those in FIG. 1 are provided with the same reference signs as those in FIG. 1.

In the third embodiment, the imaging processing unit 101 includes the imaging unit 111 and the image processing unit 112. As in the first embodiment, the imaging unit 111 includes the photography lens, and an image pickup device such as a CCD sensor or a CMOS sensor, and the imaging unit 111 generates an image signal which is an analog signal corresponding to the image of the subject 120 on the basis of light entering from the subject 120. The image processing unit 112 subjects an image signal obtained in the imaging unit 111 to various kinds of image processing. The processing includes analog processing such as amplification processing and attenuation processing. The processing also includes processing for converting the analog-processed image signal to image data which is a digital signal. The processing further includes a white balance correction, a highlight and shadow correction, a contrast correction, and a hue and saturation correction in addition to the half filter processing described above. The image processing unit 112 according to the present embodiment in particular performs image processing that differs between the inside and outside of the partial region surrounded by the boundary line set in the boundary setting unit 103. For example, the image processing unit 112 performs processing for only darkening (or brightening) the inside of the partial region as dodging processing.

The control unit 102 is a controller including a CPU and a memory, and controls the operation of the imaging processing unit 101. For example, the control unit 102 controls the operation of the imaging processing unit 101 in accordance with the selection of the partial region mode by the user so that image data having image effects differing between the inside and outside of the partial region surrounded by the boundary line set in the image data are obtained.

The boundary setting unit 103 is a processing circuit configured to set a boundary line in the image data in response to an instruction to set a boundary line by the operations of the dial operation units 134 and 135 and the cross key 136, and inform the control unit 102 of information regarding the set boundary line. The boundary setting unit 103 may be configured by software.

The dial operation units 134 and 135 are operation units which receive rotation operations by the user. The cross key 136 and the image effect switch button 137 are push buttons which receive push operations by the user. The shutter button 108 is a push button which receives a push operation by the user. The dial operation units 134 and 135 may be configured by one dial operation unit. In this case, the function of the dial operation unit 134 and the function of the dial operation unit 135 may be switched by, for example, a separately provided switch 25, button.

When operated by the user, the dial operation unit 134 instructs the boundary setting unit 103 to change a segment being selected among multiple segments. When operated by the user, the dial operation unit 135 instructs the boundary setting unit 103 to change the position of a boundary line constituent point being selected. When operated by the user, the cross key 136 instructs the boundary setting unit 103 to change, for example, the position of the central point of the partial region. When operated by the user, the image effect switch button 137 instructs the control unit 102 to change the kinds of image effects to be applied to the inside and outside of the partial region. Details of the dial operation units 134 and 135, the cross key 136, and the image effect switch button 137 will be described later. When operated by the user, the shutter button 108 instructs the control unit 102 to start photography.

The display unit 109 is provided, for example, on the backside of the body of the imaging apparatus 100. This display unit 109 is, for example, a liquid crystal display, and displays an image based on the image data acquired in the imaging processing unit 101. The display unit 109 displays the boundary line so that the boundary line can be visually recognized by the user. A touch panel may be formed in the display unit 109.

The recording unit 110 is, for example, a flash memory, and records an image based on the image data acquired in the imaging processing unit 101.

The electronic viewfinder 138 is a finder that uses a liquid crystal display or an organic EL display. The electronic viewfinder 138 is configured to display an image based on image data generated in the imaging unit 111, in a manner similar to the display unit 109. The electronic viewfinder 138 displays an image with an image effect when the image effect is applied to the image by the image processing unit 112. Thus, the user can perform photography as he/she sees. Another advantage is that a complicated optical system is not necessary.

The eye sensor 139 is a sensor for determining whether the user is looking through the electronic viewfinder 138. When it is determined from the output of the eye sensor 139 that the user is looking through the electronic viewfinder 138, the display is switched from the display in the display unit 109 to the display in the electronic viewfinder 138. Thus, a series of operations are naturally performed; the user performs photography looking at the image displayed in the electronic viewfinder 138, and uses the display unit 109 to check the photography result.

FIG. 13A and FIG. 13B are diagrams showing the exterior of the imaging apparatus 100 according to the third embodiment. As shown in FIG. 13A, the imaging apparatus 100 comprises, on the upper surface of its body, the dial operation units 134 and 135 and the shutter button 108. In this layout, the user can operate the rear dial operation unit 135 with the thumb of the right hand while operating the front dial operation unit 134 with the first finger of the right hand. However, the present invention is not limited to this layout of the operation members. For example, other operation units such as a versatile ring may be used together.

The imaging apparatus 100 also comprises, on its backside, the display unit 109, the electronic viewfinder 138, the eye sensor 139, the cross key 136, and the image effect switch button 137. As shown in FIG. 13B, it is difficult for the user to operate the touch-panel-type display unit 109 while looking through the electronic viewfinder 138. Thus, in the present embodiment, the shape and position of an image processing region can be freely set in accordance with a dial operation using a thumb 1301 and a first finger 1302 of the right hand. This prevents the camera shake, and allows the user to concentrate on the photography and the application of the image effect. As shown in FIG. 13C, the imaging apparatus 100 may include a versatile ring 140 on its front surface. In this case, the shape and position of the boundary line can be changed or the boundary line can be rotated by the operation of the versatile ring 140.

Figure 14:
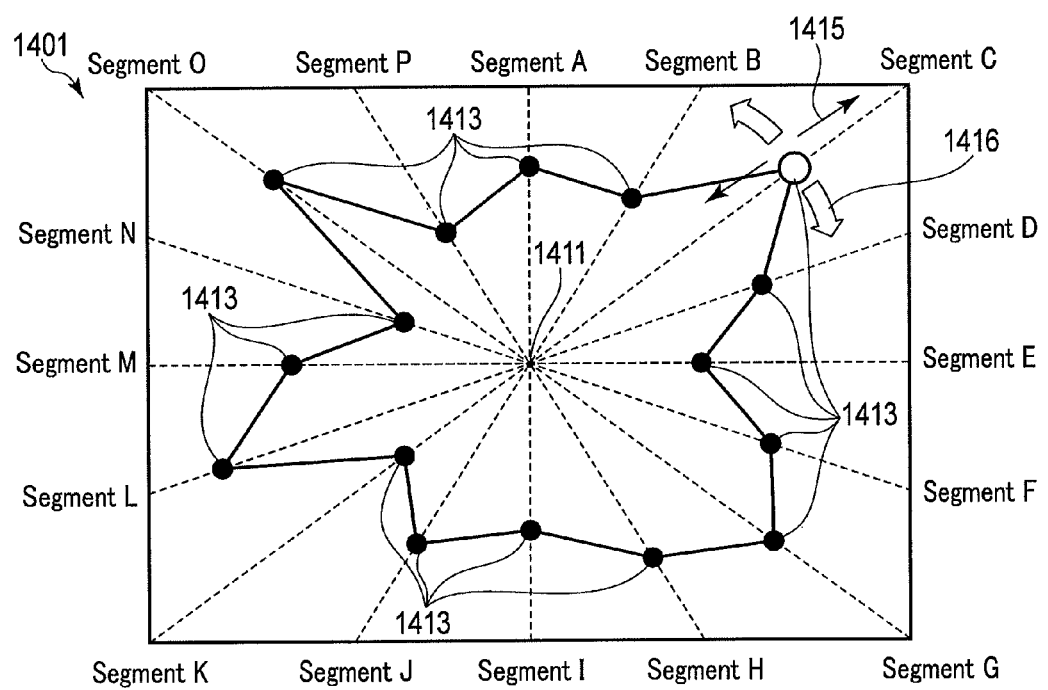
FIG. 14 is a diagram showing a boundary line setting image.

Now, the operation of the imaging apparatus 100 is described. FIG. 14 is a diagram showing a boundary line setting image 1401. The boundary line setting image 1401 includes a central point 1411, segments A to P radially extending from the central point 1411, and boundary line constituent points 1413 respectively arranged on the segments A to P. A boundary line 1414 in the present embodiment is formed by connecting all the boundary line constituent points 1413. Although 12 segments are arranged at equal angles and intervals here, the present invention is not limited to this. For example, 6 segments may be radially arranged at equal angles and intervals, or the number of segments may be changeable.

The boundary setting unit 103 changes the positions of the boundary line constituent points 1413 on the segments A to P in response to the rotational operations of the dial operation units 134 and 135. Specifically, the boundary setting unit 103 selects a segment (e.g. the segment B or D) different from the currently selected segment (e.g. the segment C) as indicated by an arrow 1416 in response to the rotational operation of the dial operation unit 134. The boundary setting unit 103 changes the position of the boundary line constituent point 1413 on the selected segment (e.g. the segment C) as indicated by an arrow 1415 in response to the rotational operation of the dial operation unit 135.

The boundary setting unit 103 may sequentially select one of the segments A to P in response to the rotational operation of the dial operation unit 135 in one direction (e.g. a rightward rotation), and sequentially change the position of the boundary line constituent point 1413 on the selected segment in response to the rotational operation in the other direction (e.g. a leftward rotation). In this case, in contrast to the arrow 1415 in FIG. 14, the direction of the positional change of the boundary line constituent point 1413 is one inward or outward direction. In this case, when reaching one end (e.g. the outer end) of the segment, the boundary line constituent point 1413 may be configured to move to, for example, the other end (e.g. the central point) of the segment. In this way, the shape of the boundary line can be controlled by one dial operation unit.

The boundary setting unit 103 may have a segment selection mode for selecting one of the segments A to P in response to the rotational operation of the dial operation unit 134, and a point selection mode for changing the position of the boundary line constituent point 1413 on the selected segment in response to the rotational operation of the dial operation unit 134. In this case, it is preferable to further have an operation unit which receives an operation for switching between the segment selection mode and the point selection mode. In this configuration, the operation for selecting a segment and the operation for changing the position of the boundary line constituent point are performed by one dial operation unit.

The dial operation unit 134 is supposed to be operated with the first finger 1302, and is easily rotated by the user and is therefore suited to the segment selection. On the other hand, the dial operation unit 135 is supposed to be reciprocated with a thumb 1201, and is suited to the movement of the boundary line constituent point on the segment. These dials including the versatile ring can be easily operated with the fingertip alone in two directions and facilitate trial and error, so that a region to be targeted for image processing can be rapidly and accurately set. These dials do not require the change of the positions of the fingers during operation, and are therefore suited particularly to the operation through the finder.

Figure 15:
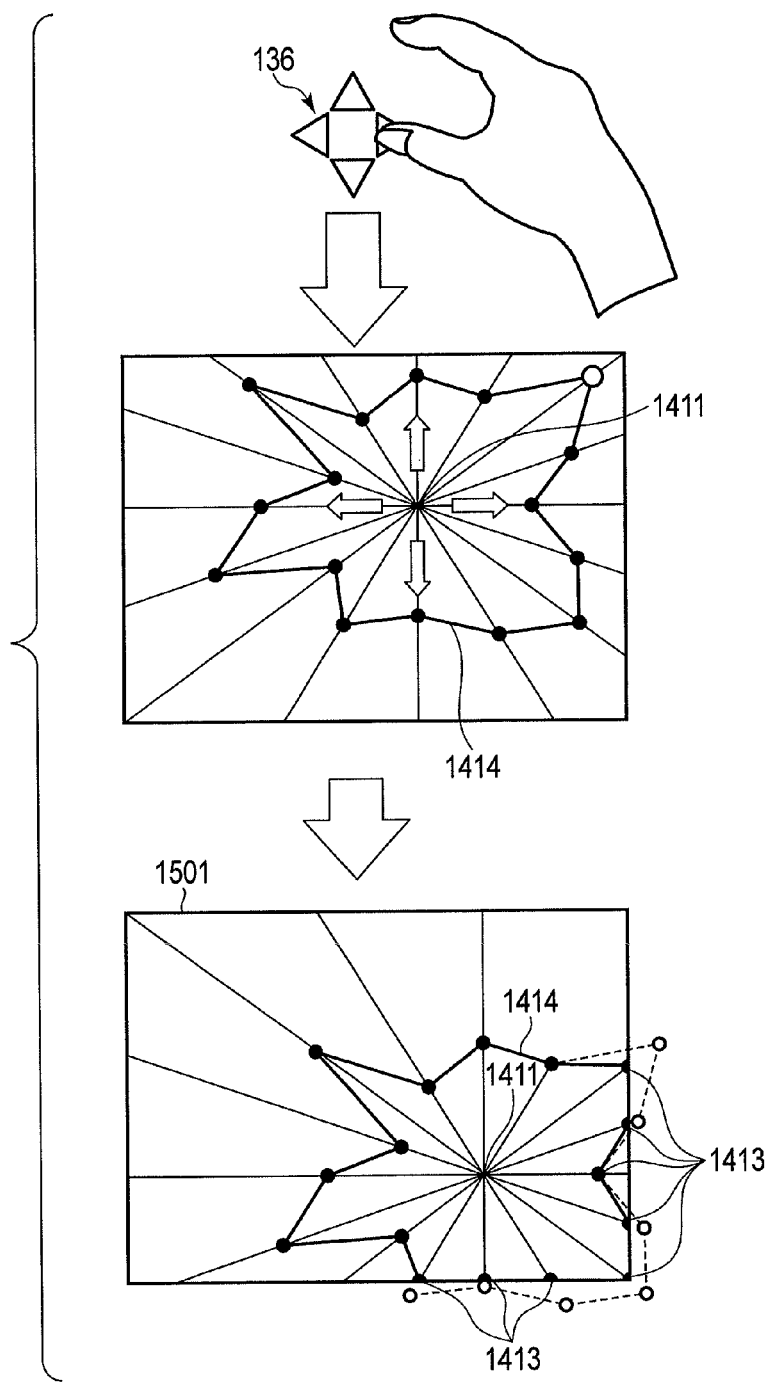
FIG. 15 is a diagram showing the change of the position of a central point.

As shown in FIG. 15, the cross key 136 functions as an operation unit for changing the position of the central point 1411. If the cross key 136 is operated, the central point 1411 moves up and down and right and left. In response to the movement of the central point 1411, the radial segments A to P and the boundary line constituent points 1413 move up and down and right and left without changing their relative positions. That is, the partial region surrounded by the boundary line 1414 moves without changing its shape. When the boundary line 1414 projects from the image range seen in the display unit 109 or the electronic viewfinder 138 due to the movement of the central point 1411, the boundary line constituent points 1413 are automatically moved toward the inside of the segments A to P (from white circles to black circles in the drawing) as shown in a screen 1501 in FIG. 15. As a result, the boundary line constituent points 1413 are located at the edge of the display unit 109 or the electronic viewfinder 138. Therefore, the boundary line 1414 is always displayed within the display unit 109 or the electronic viewfinder 138.

Figure 16:
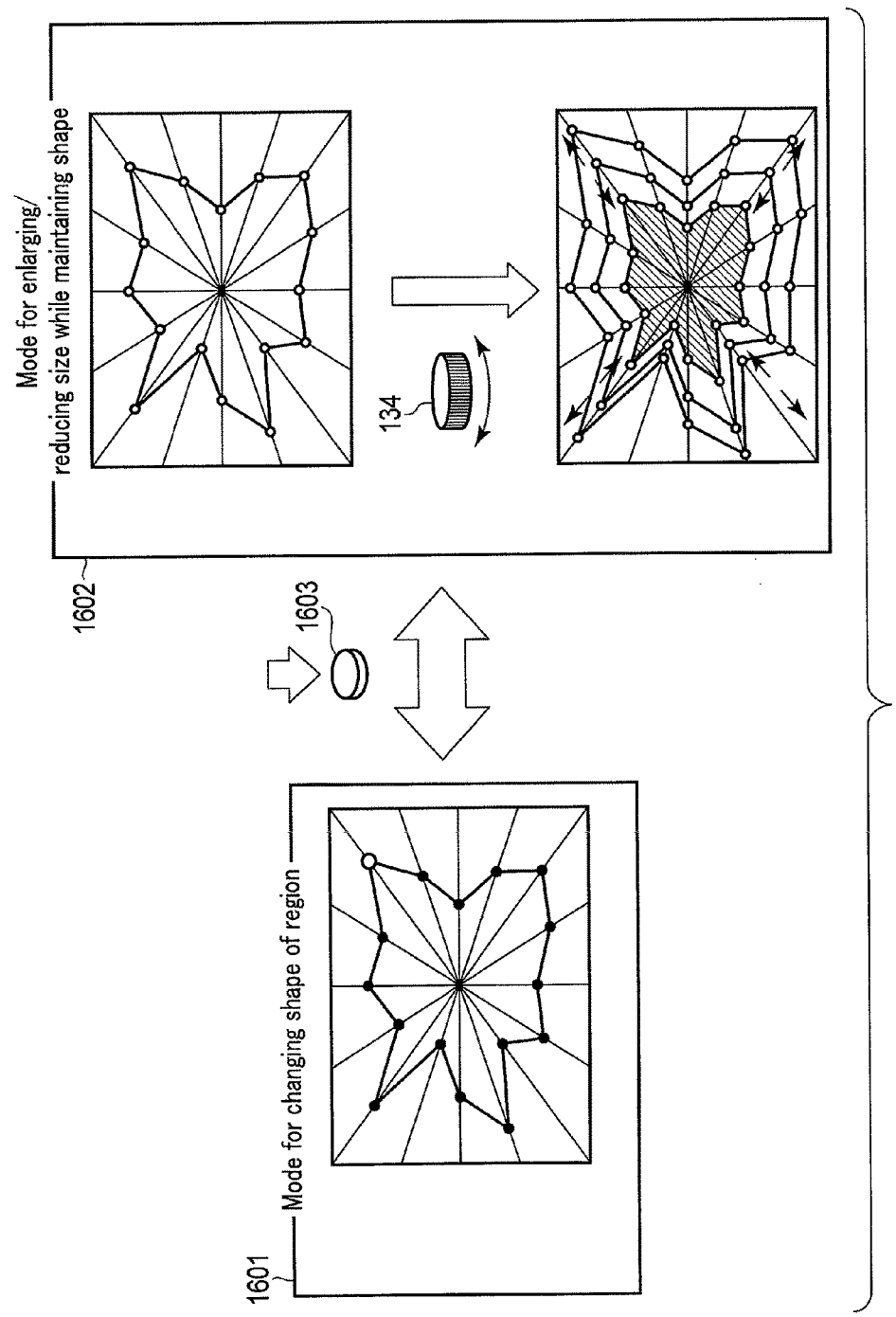
FIG. 16 is a diagram showing a shape change mode and a size change mode.

As shown in FIG. 16, the boundary setting unit 103 may have, for example, a size changing mode 1602 for changing the size of the partial region surrounded by the boundary line while maintaining the shape of the boundary line in response to the rotational operation of the dial operation unit 134 (or the dial operation unit 135), in addition to a shape changing mode 1601 for changing the shape of the boundary line. In this case, an operation unit 1603 for switching between the shape changing mode 1601 and the size changing mode 1602 is provided, for example, on the backside of the imaging apparatus 100. The operation unit 1603 may be, for example, the versatile ring 140.

Figure 17:
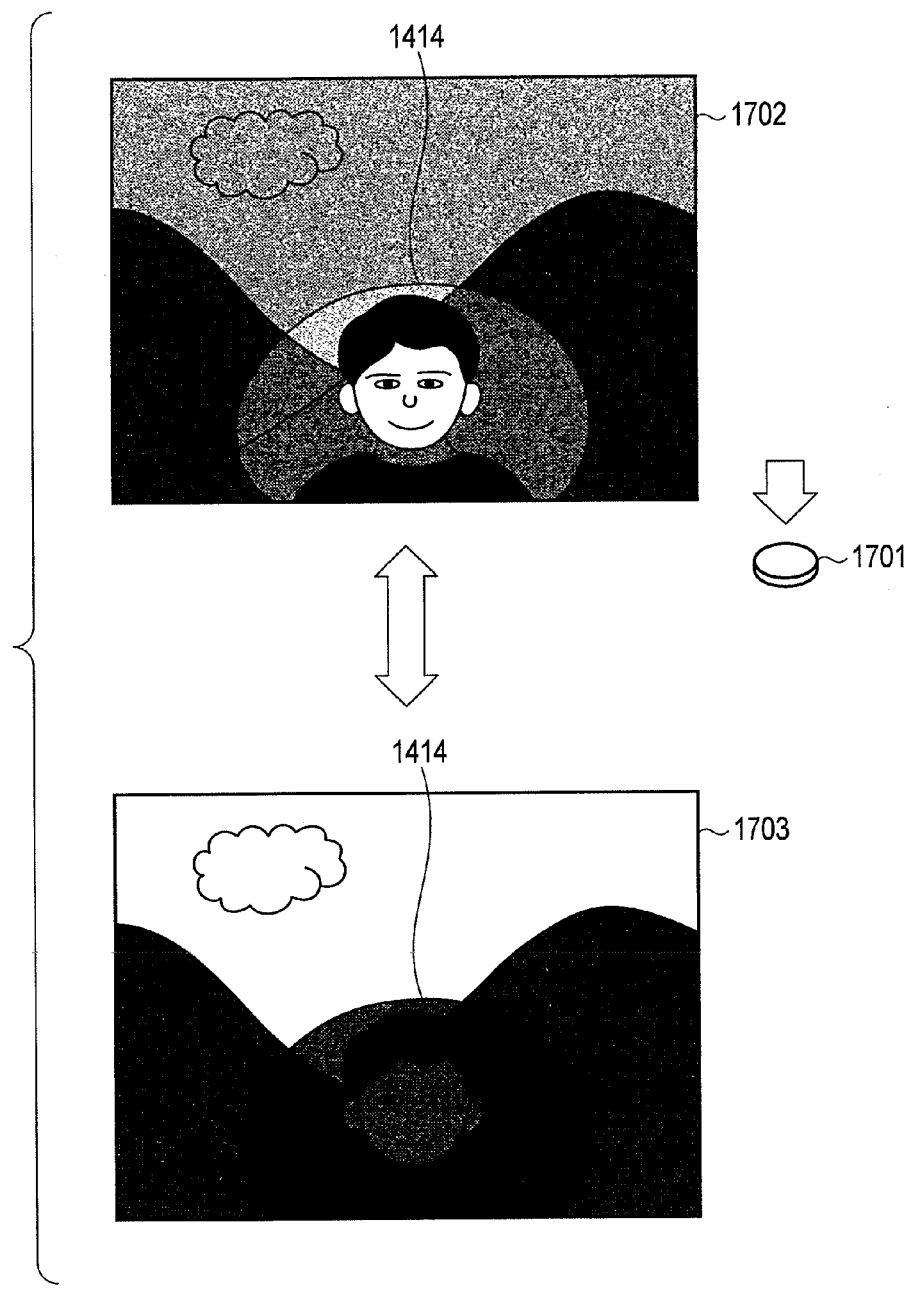
FIG. 17 is a diagram showing an example of display in which a partial region inside a boundary line can be clearly differentiated from a partial region outside the boundary line.

As shown in FIG. 17, the partial regions inside and outside the boundary line 1414 may be displayed in a clearly distinguishable manner. For example, the through-image in the partial region inside the boundary line 1414 targeted for image processing may be clearly displayed, and a semitransparent gray image may be laid over the through-image in the partial region outside the boundary line 1414. The imaging apparatus 100 may be provided with a switch operation unit 1701 for switching the partial region to be targeted for image processing to the partial region inside or outside the boundary line 1414. The display is switched between a screen 1702 and a screen 1703 by the operation of the switch operation unit 1701.

Different types of image processing are performed across the boundary line in the example shown in FIG. 17. The image processing may be not only switched on the boundary line but also switched in stages from the boundary line.

Regions closed by boundary lines may be set in the same image. In this case, the same image processing or different types of image processing may be performed inside the boundary lines. Moreover, a boundary line set in a certain image may be copiable to another image.

Figure 18:
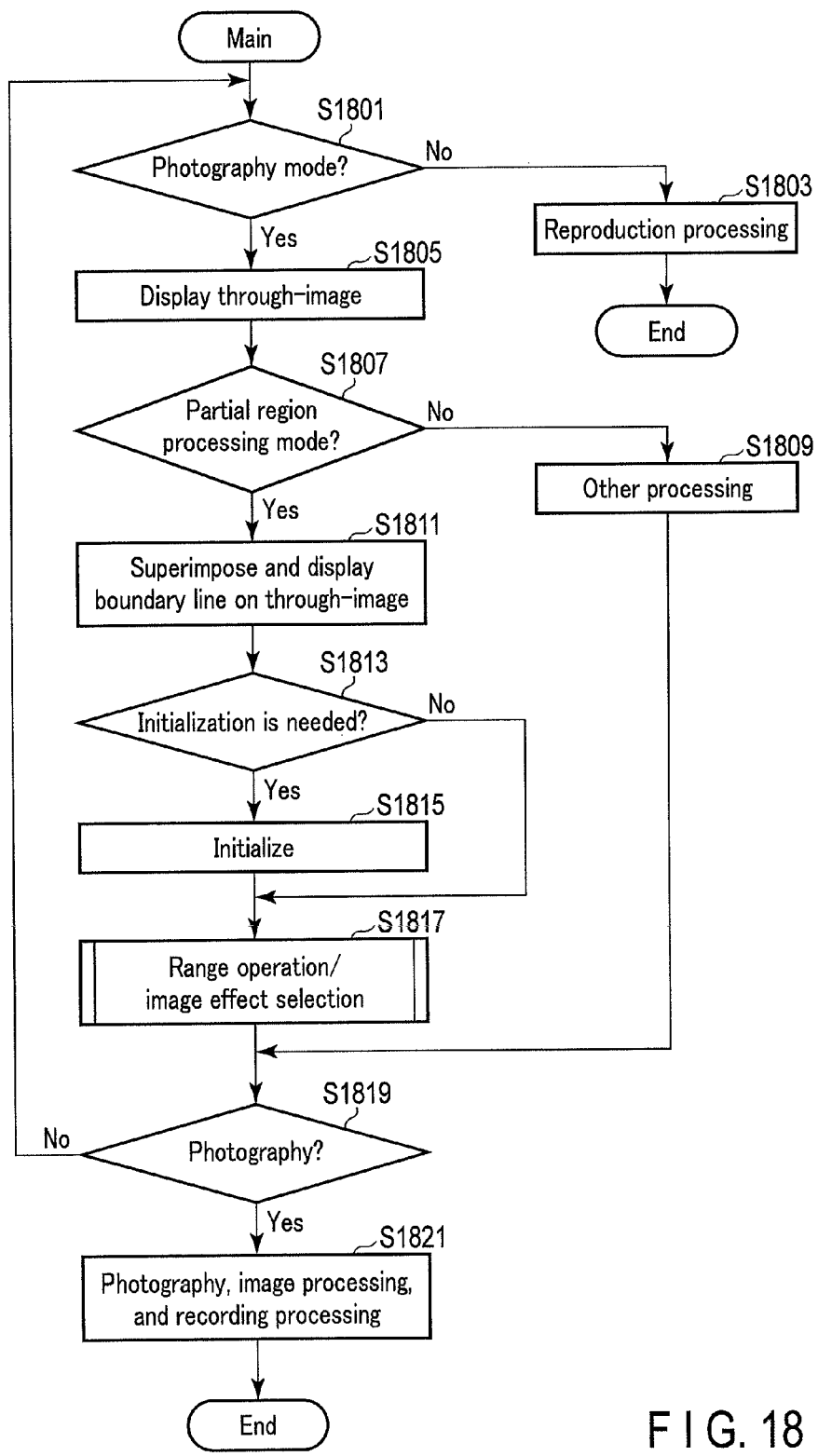
FIG. 18 is a flowchart illustrating the flow of overall processing in the imaging apparatus according to the third embodiment.

FIG. 18 is a flowchart illustrating the flow of the overall processing in the imaging apparatus 100 according to the third embodiment.

In step S1801, the imaging apparatus 100 determines whether the operation mode is the photography mode. In the case of the photography mode, the processing proceeds to step S1803. In step S1803, the imaging apparatus 100 performs reproduction processing. Details of the reproduction processing are not described. After the end of the reproduction processing, the processing in FIG. 18 is finished.

In the case of the photography mode, the processing proceeds to step S1805. In step S1805, the imaging apparatus 100 displays a through-image. In step S1807, the imaging apparatus 100 determines whether the photography mode is set to a partial region processing mode. When the photography mode is not set to the partial region processing mode, the processing proceeds to step S1809. In step S1809, the imaging apparatus 100 performs other processing. The other processing includes, for example, normal photography processing that does not apply the processing in the partial region mode. Details of the normal photography processing are not described. After the end of the other processing, the processing in FIG. 18 is finished.

When the photography mode is set to the partial region processing mode, the processing proceeds to step S1811. In step S1811, the imaging apparatus 100 superimposes and displays a boundary line on the through-image.

In step S1813, the imaging apparatus 100 determines whether the parameters of the partial region processing need to be initialized. For example, the imaging apparatus 100 determines that the initialization is needed at the start of the user operation or at the time of a redoing operation. When the initialization is needed, the processing proceeds to step S1815. In step S1815, the imaging apparatus 100 initializes the parameters of the partial region processing (e.g. the shape of the boundary line (the position of the boundary line constituent point), the position of the boundary line, and the contents of the image effect). When the initialization is not needed, the processing proceeds to step S1817. In this case, the parameters of the partial region processing (e.g. the shape of the boundary line, the position of the boundary line, and the contents of the image effect) are not initialized because, for example, a sequential operation is performed. Thus, the previous operation is reflected in the next partial region processing.

In step S1817, the imaging apparatus 100 performs range operation/image effect selection processing. In this processing, the imaging apparatus 100 decides the shape and position of the boundary line in accordance with the operations of the dial operation units 134 and 135 and operation of, for example, the cross key 136 by the user. The imaging apparatus 100 also selects the kind of image effect in accordance with the operation of the image effect switch button 137 by the user. Details of step S1817 will be described later.

In step S1819, the imaging apparatus 100 determines whether a photography operation has been performed. The photography operation is, for example, the operation of the shutter button 108. When the photography operation has not been performed, the processing returns to step S1801. When the photography operation has been performed, the processing proceeds to step S1821. In step S1821, the imaging apparatus 100 performs photography. The imaging apparatus 100 then performs different image processing for each partial region in accordance with the setting of the parameters of the current partial region processing (e.g. the shape of the boundary line, the position of the boundary line, and the contents of the image effect). The imaging apparatus 100 then records the image obtained by the photography in the recording unit 110. The processing in FIG. 18 is finished afterwards.

Figure 19:
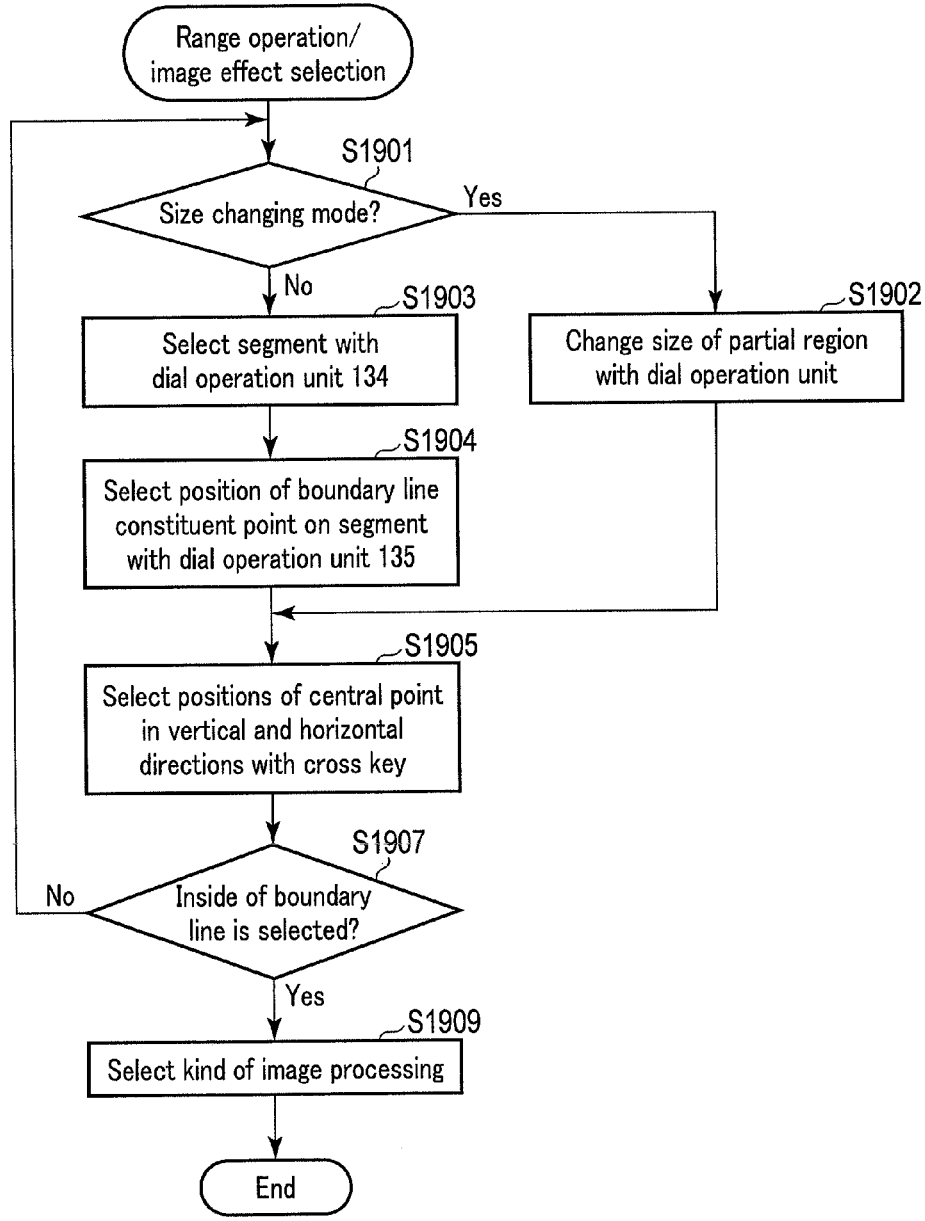
FIG. 19 is a flowchart showing the flow of range operation/image effect selection processing.

FIG. 19 is a flowchart showing the flow of the range operation/image effect selection processing. In step S1901, the imaging apparatus 100 determines whether the size changing mode is currently set. When the size changing mode is currently set, the processing proceeds to step S1902. In step S1902, the imaging apparatus 100 changes the size of the partial region surrounded by the boundary line in accordance with the operation of the dial operation unit 134 by the user. The processing then proceeds to step S1905.

When the size changing mode is not set, that is, when a shape selection mode is set, the processing proceeds to step S1903. In step S1903, the imaging apparatus 100 selects one segment in accordance with the operation of the dial operation unit 134 by the user. In step S1904, the imaging apparatus 100 then changes the position of the boundary line constituent point in the currently selected segment in response to the operation of the dial operation unit 135 by the user. The processing then proceeds to step S1905.

In step S1905, the imaging apparatus 100 changes the position of the central point in response to the operation of the cross key 136 by the user. The imaging apparatus 100 also changes the position of the partial region in accordance with the change of the position of the central point.

In step S1907, the imaging apparatus 100 determines whether the partial region inside or outside the boundary line is selected as a target for image processing in response to the operation of the switch operation unit 1701 by the user. When no partial region to be targeted for image processing is selected, the processing returns to step S1901.

When partial region to be targeted for image processing is selected, the processing proceeds to step S1909. In step S1909, the imaging apparatus 100 selects an image effect to be applied to the target partial region in accordance with the operation of the image effect switch button 137 by the user. Afterwards, the processing in FIG. 19 is finished, and the processing proceeds to step S1819.

As described above, according to the present embodiment, it is possible to more freely set a region to which image processing is to be applied than in the first and second embodiments.

In the third embodiment, the method of deciding the shape of the partial region by deciding the position of the boundary line constituent point on the radial segment is described. The arrangement and number of segments and the initially set shape of the partial region in this case are not limited to the example described above. For example, the initially set shape of the partial region may be elliptical as shown in FIG. 20A or rectangular as shown in FIG. 20B. The number of segments which is the number of divisions of the boundary may be changed depending on the shape shown in FIG. 20C.

Other Embodiments

While the present invention has been described above with reference to the embodiments, the present invention is not limited to the embodiments described above. Various modifications that can be appreciated by the skilled person can be made to the configurations and details according to the present invention within the scope of the present invention. Systems and devices having any combinations of the separate features included in the respective embodiments also fall within the scope of the present invention. The imaging apparatus according to the present invention is not only applicable to a digital camera but also applicable town endoscope, microscope, or a monitoring device that has a rotational operation unit such as a dial.

The present invention may also be applied to a system composed of multiple devices or applied to a single device. Moreover, the present invention is also applicable to the case in which an information processing program that enables the functions according to the embodiments is directly or remotely supplied to a system or a device. Therefore, a program to be installed in a computer to achieve the functions according to the present invention in the computer, or a medium storing this program, and a World Wide Web (WWW) server for downloading the program also fall within the scope of the present invention. In particular, at least a non-transitory computer-readable medium storing a program which causes a computer to execute the processing steps included in the embodiments described above falls within the scope of the present invention.

What is claimed is:

1. An imaging apparatus comprising:
an imaging processing circuit which acquires image data having a predetermined image effect;
an operation dial which receives a dial operation to set at least one boundary line in the image data;
a boundary setting circuit which sets the boundary line in the image data in response to the dial operation;
a controller which controls the imaging processing circuit so that image data having different image effects are obtained in the respective partial regions of the image data that are divided by the boundary line set by the boundary setting circuit and
a display which displays a central point, segments radially extending from the central point, and boundary line constituent points which are points on the segments and which constitute the boundary line when the boundary line constituent points are connected to one another,
wherein the operation dial includes a first operation dial which receives a dial operation to set positions of the boundary line constituent points, and
the boundary setting circuit sets the position of the boundary line in response to the dial operation of the first operation dial.

2. The imaging apparatus according to claim 1, wherein the operation dial includes a third operation dial which receives a dial operation to set a correction factor of the image effect for each of the partial regions, and
the imaging processing circuit acquires the image data in accordance with the correction factor.

3. The imaging apparatus according to claim 1, wherein the boundary line forms a closed region, and
the controller controls the imaging processing circuit so that image data having different image effects are obtained in the respective partial regions inside and outside the closed region.

4. The imaging apparatus according to claim 1, wherein the operation dial includes a second operation dial which receives a dial operation to select one of the segments, and
the first operation dial receives a dial operation to set a position of the boundary line constituent point on the segment selected by the dial operation of the second operation dial.

5. The imaging apparatus according to claim 1, further comprising a first operation control which receives an operation to switch between a point selection mode and a segment selection mode, the point selection mode being designed to receive a dial operation by the first operation dial to set the position of the boundary line constituent point, the segment selection mode being designed to receive a dial operation by the first operation dial to select one of the segments.

6. The imaging apparatus according to claim 1, further comprising a second operation control which receives an operation to change a position of the central point.

7. The imaging apparatus according to claim 6, wherein the boundary setting circuit changes the position of the boundary line while maintaining a shape of the boundary line in response to the operation of the second operation control.

8. The imaging apparatus according to claim 1, wherein the boundary setting circuit has a size changing mode to change a size of a region surrounded by the boundary line while maintaining a shape of the boundary line in response to the dial operation of the first operation dial, the imaging apparatus further comprising a third operation control which receives an operation to switch to the size changing mode.

9. The imaging apparatus according to claim 1, wherein the image effect includes at least one of a brightness correction, a contrast correction, a highlight and shadow correction, a white balance correction, and a hue and saturation correction in the image data.

10. A control method of an imaging apparatus comprising:
receiving a dial operation by a operation dial to set at least one boundary line in image data;
setting the boundary line in the image data in response to the dial operation;
controlling an imaging processing unit so that image data having different image effects are obtained in the respective partial regions of the image data that are divided by the set boundary line; and
displaying a central point, segments radially extending from the central point, and boundary line constituent points which are points on the segments and which constitute the boundary line when the boundary line constituent points are connected to one another,
wherein the operation dial receives a dial operation to set positions of the boundary line constituent points, and
the position of the boundary line is set in response to the dial operation of the operation dial.

11. A computer-readable non-transitory storage medium to record a program to cause a computer to:
receive a dial operation by a operation dial to set at least one boundary line in image data;
set the boundary line in the image data in response to the dial operation;
control an imaging processing unit so that image data having different image effects are obtained in the respective partial regions of the image data that are divided by the set boundary line; and
display a central point, segments radially extending from the central point, and boundary line constituent points which are points on the segments and which constitute the boundary line when the boundary line constituent points are connected to one another,
wherein the operation dial receives a dial operation to set positions of the boundary line constituent points, and
the position of the boundary line is set in response to the dial operation of the operation dial.

* * * * *